(12) United States Patent
Careri et al.

(10) Patent No.: US 8,462,162 B2
(45) Date of Patent: Jun. 11, 2013

(54) SYSTEMS AND METHODS FOR FINANCIAL PLANNING USING ANIMATION

(76) Inventors: Christopher Franklin Careri, North Babylon, NY (US); Enrico Indelicato, III, North Babylon, NY (US)

(*) Notice: Subject to any disclaimer, the term of this patent is extended or adjusted under 35 U.S.C. 154(b) by 0 days.

(21) Appl. No.: 13/396,778

(22) Filed: Feb. 15, 2012

(65) Prior Publication Data
US 2013/0021347 A1 Jan. 24, 2013

Related U.S. Application Data

(60) Provisional application No. 61/443,661, filed on Feb. 16, 2011.

(51) Int. Cl.
*G06T 13/00* (2011.01)
(52) U.S. Cl.
USPC .............................................. 345/473; 705/35
(58) Field of Classification Search
None
See application file for complete search history.

(56) References Cited

U.S. PATENT DOCUMENTS

| | | | |
|---|---|---|---|
| 5,553,221 A | 9/1996 | Reimer et al. |
| 5,675,746 A | 10/1997 | Marshall |
| 5,933,815 A | 8/1999 | Golden |
| 5,987,433 A | 11/1999 | Crapo |
| 6,181,334 B1 | 1/2001 | Freeman et al. |
| 6,278,991 B1 | 8/2001 | Ebert |
| 6,349,290 B1 | 2/2002 | Horowitz et al. |
| 6,493,681 B1 | 12/2002 | Tertitski et al. |
| 6,513,019 B2 | 1/2003 | Lewis |
| 6,527,556 B1 | 3/2003 | Koskinen |
| 6,729,884 B1 | 5/2004 | Kelton et al. |
| 6,859,212 B2 | 2/2005 | Kumar et al. |
| 6,890,179 B2 | 5/2005 | Rogan et al. |
| 7,103,556 B2 | 9/2006 | Del Rey et al. |
| 7,117,173 B1 | 10/2006 | Ambani |
| 7,315,837 B2 | 1/2008 | Sloan et al. |
| 7,370,004 B1 | 5/2008 | Patel et al. |
| 7,383,218 B1 | 6/2008 | Oros |
| 7,555,451 B2 | 6/2009 | Rugge et al. |
| 7,689,494 B2 | 3/2010 | Torre et al. |
| 7,805,344 B2 | 9/2010 | Smith |
| 7,818,233 B1 | 10/2010 | Sloan et al. |
| 7,880,738 B2 | 2/2011 | Abagyan et al. |
| 7,999,810 B1 * | 8/2011 | Boice et al. .................... 345/473 |
| 2002/0143680 A1 | 10/2002 | Walters et al. |
| 2003/0028466 A1 | 2/2003 | Jenson et al. |

(Continued)

FOREIGN PATENT DOCUMENTS

WO   WO2009123378   10/2009

OTHER PUBLICATIONS

Xu Liu, "A Survey of Internet Visualization Tools", Spring 2005, http://www.cs.umd.edu/class/spring2005/cmsc838s/viz4all/viz4all_i.html.*

(Continued)

*Primary Examiner* — Kee M Tung
*Assistant Examiner* — Ryan D McCulley
(74) *Attorney, Agent, or Firm* — Scully, Scott, Murphy & Presser, P.C.

(57) ABSTRACT

A methodology of presenting an entity's financial information is presented. The methodology, in one aspect, can receive input data associated with the entity's financial information, and generate an animated representation of the entity's financial information along one or more determined timelines employing a plurality of graphical characters based on the input data, and can also display the animated representation.

20 Claims, 33 Drawing Sheets

U.S. PATENT DOCUMENTS

| | | | |
|---|---|---|---|
| 2006/0095283 A1* | 5/2006 | Matsumoto et al. | 705/1 |
| 2006/0277132 A1* | 12/2006 | Brooks | 705/35 |
| 2007/0005468 A1 | 1/2007 | Feller et al. | |
| 2007/0005477 A1* | 1/2007 | McAtamney | 705/35 |
| 2007/0027736 A1* | 2/2007 | Reynolds et al. | 705/8 |
| 2007/0226163 A1* | 9/2007 | Robles | 706/50 |
| 2009/0262108 A1 | 10/2009 | Davidson et al. | |
| 2010/0161467 A1* | 6/2010 | Ageenko et al. | 705/35 |
| 2011/0055066 A1 | 3/2011 | Themmen et al. | |
| 2011/0055115 A1 | 3/2011 | Hu et al. | |

OTHER PUBLICATIONS

Jeff Reifman, "Visualize Microsoft's Tax Dodge within Washington State Deficit Bubble Graph", Nov. 2009, http://blog.reifman.org/2009/11/visualize-microsofts-tax-dodge-within-washington-state-deficit-bubble-graph.html.*

Lei et al., A Visual Analytics System for Financial Time-Series Data, Proceedings of the 3rd International Symposium on Visual Information Communication ACM, 2010, New York, NY, USA ISBN: 978-1-4503-0436-8doi>10.1145/1865841.1865868.

* cited by examiner

CiFiCo QUESTIONAIRE

To create a unique and customized movie for Joe Smith, he enters some basic information...

| Prior Generation (Mom & Dad) | Focus Generation (Joe Smith) | Next Generation (Kids) | Lower Generation (Grandchildren) |

+ TIMELINE
Name: Joe Smith
Age: 30
End Age: 100

+ WEF ATTACK
Type: LAWSUIT ATTACK
Amount: $200,000
Age: 45

+ REAL ESTATE
Market Value: $300,000
Growth Rate: 4%
Annual Mortgage: $30,0000
Equity: $50,0000
Term: 30
Beneficiary: Lower Generation

+ DEBT
Amount: $12,000
Rate: 10%
Annual: $1,000

+ NEST EGG
IRA: $50,000 net
Annual: $5,000
Beneficiary: Lower Generation

+ LIFE INSURANCE
Policy Type: Whole Life
Source: Illustration Sync
Death Benefit: $500,000
Cash Value: $50,000
Trust: ILIT
Beneficiary: Lower Generation

+ INCOME
Annual: $100,000 net
Duration: To Age 65

+ WEF DEFENSE
Type: LIABILITY INSURANCE
Amount: $100,000

This is an example of a fact finder.

FIG. 10

...through the use of Visualized Financial Storytelling, powered by CiFiCo, Joe Smith and his family will have the following events cinematized:

1. Joe paying the mortgage on his primary real estate; his home value and equity growing.
2. Joe paying his life insurance premiums; his cash value and death benefit growing.
3. Joe contributing to his nest egg containing his IRA and Cash Account; his values growing.
4. Joe paying down his debt.
5. Joe being attacked by a wealth eroding factor, in this case a lawsuit.
6. Joe's liability insurance reducing the lawsuit WEF (*Wealth Eroding Factor*) attack.
7. Joe's parents (Prior Generation) passing away and leaving inheritance to Joe.
8. Joe entering retirement and using his Nest Egg for retirement income.
9. Joe passing away, and leaving his assets to his kids (Next Generation).
10. Joe's final taxes on asset transfers being paid and the net inheritance passing to his kids (Next Generation).

We will now communicate all of these financial concepts in one brief *CiFiCo* movie.

FIG. 11

SYSTEMS AND METHODS FOR FINANCIAL PLANNING USING ANIMATION

CROSS-REFERENCE TO RELATED APPLICATIONS

This application claims the benefit of U.S. Provisional Patent Application No. 61/443,661, filed Feb. 16, 2011, the entire disclosure of which is hereby incorporated by reference herein.

BACKGROUND OF THE INVENTION

The technical field of this invention is financial planning using animation.

On any given day, there are millions of business meetings and presentations, most of which involve the movement of money. Party A is trying to communicate, teach or sell some financial idea to party B. The traditional methods of communicating this information are through the use of pie charts, diagrams, spreadsheets and other motionless data.

There are an infinite number of non-animated methods to present financial concepts, most of them being static charts and graphs. This causes apathy, confusion, and wastes time and money.

In partnership with Survey Monkey, the inventors polled 500 members of the U.S. population, in an effort to gauge the need for animated financial software to assist with understanding financial concepts. After seeing a demonstration of this invention, the survey participants were asked a series of questions. There was no incentive for completing the survey. The following data was extracted from the study:

- 1 out of every 2 members of the general public said they find it difficult to understand financial concepts.
- 99% of the general public stated that animated financial software would simplify the communication of financial concepts and strategies.

Having verified the need and market for this invention, the inventors, who are financial planners and have worked in the field for over a decade, developed software that provides a dynamic, personalized, and non-static method with which to better educate and advise individuals and businesses with regard to financial concepts. The software is called "CiFiCo," or "Cinematic Financial Concepts."

SUMMARY OF THE INVENTION

Through the creation of one simple animated visual language, CiFiCo will reduce the mass confusion typically associated with the relation of financial concepts, saving time and money and better educating those seeking financial recommendations and advice.

When loaded onto any computer, the CiFiCo software takes dull, complex information and "cinematizes" it into fun, simple, engaging, moving visual representations (aka "movies") accompanied by sound and touch control. The user has complete control over every aspect of this virtual world.

After the user answers a brief series of questions, CiFiCo instantly generates an animated representation (movie) of their financial world. Movies contain various assets, incomes, and insurance, as well as intergenerational timelines. These concepts are illustrated with the use of a defined and user-friendly set of abstract characters, as seen in the incorporated drawings. This allows the user to quickly and clearly communicate a particular concept or a variety of concepts.

CiFiCo can demonstrate the impact of asset accumulation, distribution, taxes, insurance, investments, intergenerational transfers, and countless other concepts. The tool allows individuals to gain a unique perspective on how the financial decisions they make (past, present and future) can impact their overall financial picture (movie).

CiFiCo can illustrate and factor for contributions and distributions, as well as risks or attacks that may draw against someone's financial stability (e.g. death, disabilities, long term care costs, lawsuits, natural disasters, market volatility, etc.). The application can illustrate a single financial concept, compare several financial strategies, or portray a fully integrated, multi-generational, financial plan. Any financial concept, philosophy, or strategy can be communicated using CiFiCo—creating instant understanding for even the most non-finance oriented individuals.

BRIEF DESCRIPTION OF THE DRAWINGS

FIGS. 10-33 are example screen shots showing a sample animation in one embodiment of the present disclosure.

DETAILED DESCRIPTION OF THE INVENTION

Figure 1:
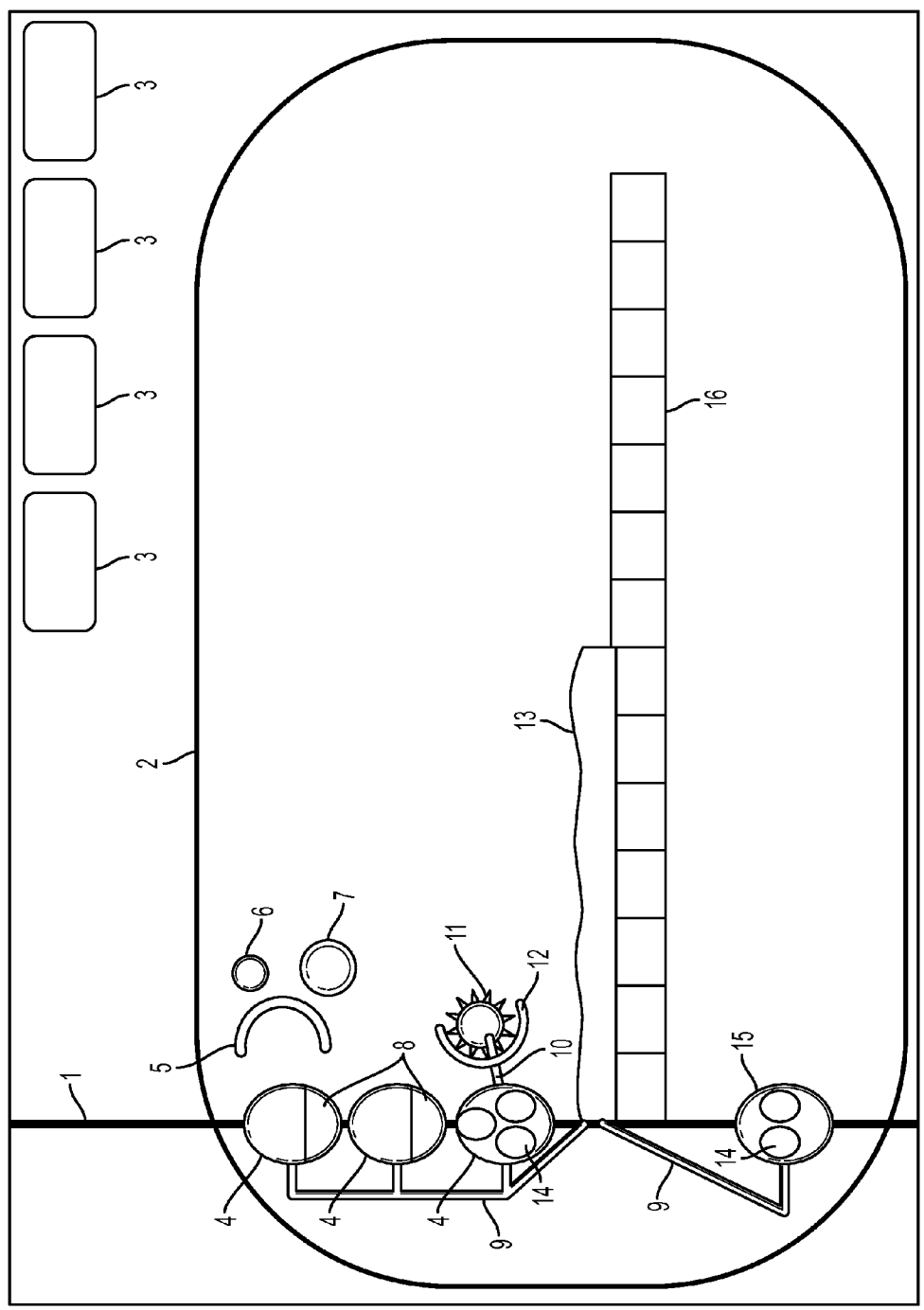
FIG. 1 and FIG. 2 illustrate a set of abstract characters and graphics used to animate CiFiCo's movies.
Figure 2:
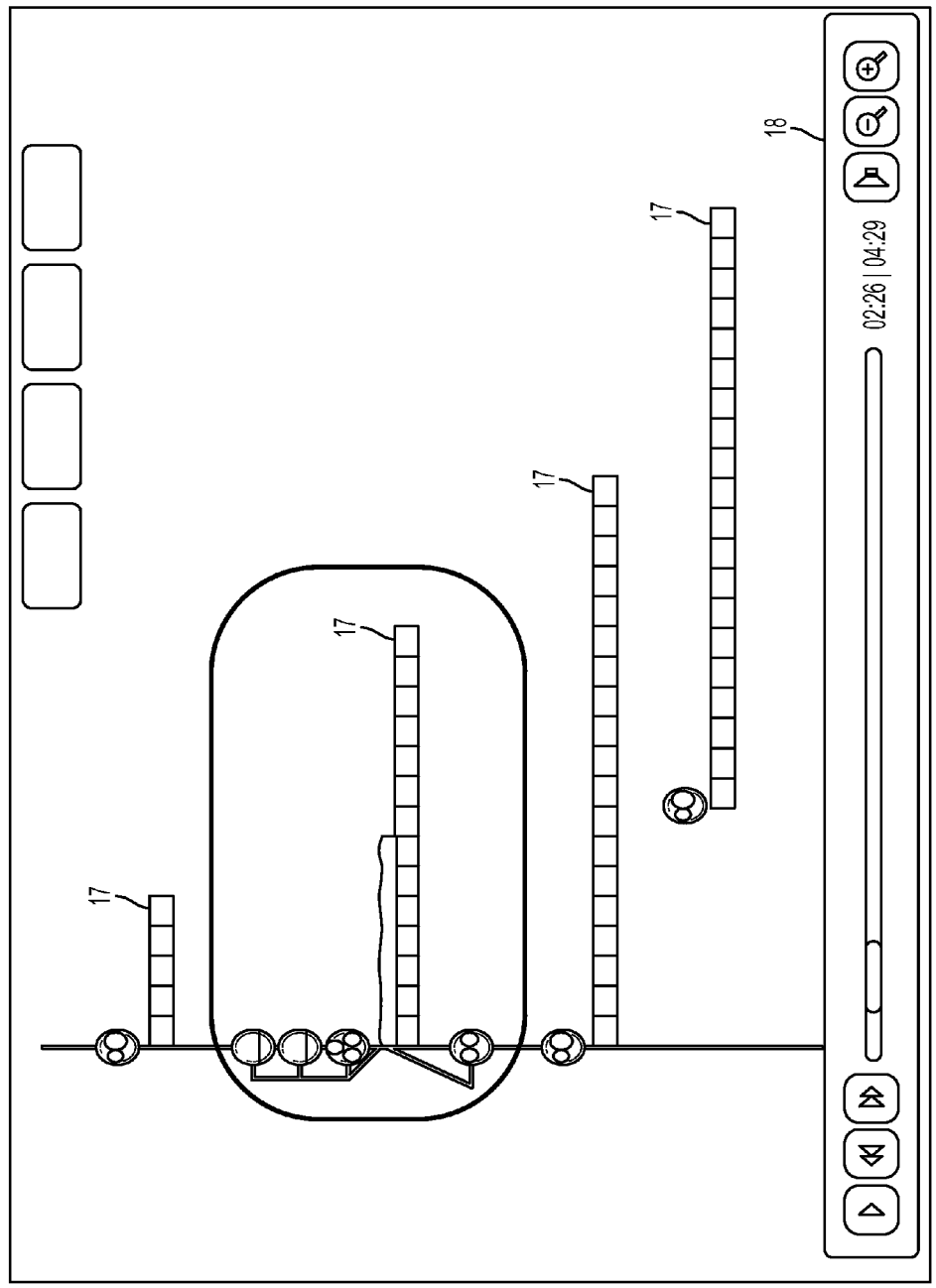

FIG. 1 and FIG. 2 illustrate a set of abstract characters and graphics used to animate CiFiCo's movies. The numbers in the figures are used to indicate specific characters used in the software, as follows:

Item 1 shows Meridian—A line that travels through the center of all Asset Tanks during movie playback. These lines help users identify the current place in time on a specific timeline.

Item 2 shows Wealth Protection Membrane—An entity and barrier (e.g. giant "force field"), that represents how well protected an Asset Tank is from potential risks, WEF (Wealth Eroding Factor) attacks or financial downturn. If an entity has little protection it is represented as a thin, barely visible line; an entity with maximum protection would see a thick, glowing, healthy line surrounding their Asset Tanks and Timeline.

Item 3 shows Pool—A visual representation of the sums of ongoing values as a movie plays—pools get larger or smaller as their calculated values change. Pools can be customized, (e.g. Tax bubbles flow to "tax pools," WEFs (Wealth Eroding Factors) flow towards WEF pools, lifestyle spending flows to "lifestyle pools," and the value of money distributed to others, flows to "legacy pools."

Item 4 shows Assets Tanks—Orbs filled with money that represent one or more accounts or assets. For example: nest egg, real estate, life insurance, business interests, etc. These orbs are able to expand, contract, explode, melt into each other, divide into any fraction, as well as change in texture/permeability and color.

Item 5 shows Tax Membrane—Visual entities that Asset Tanks and Money Bubbles pass through at specified times during a movie's playback. This membrane shrinks Asset Tanks and Money Bubbles according to tax implications set by the user. The overall severity of this membrane is linked to its thickness, length, and color.

Item 6 shows Tax Bubble—A visual representation of taxes directed towards a tax pool. These entities are directly related to a specific account and a Tax Membrane.

Item 7 shows Money Bubble—A visual representation of the sum of money moving to beneficiaries, Income Rivers, Asset Tanks, pools, etc.

Item 8 shows Secondary Values—A visual representation of the sum of a secondary value [e.g. A home with mortgage may have a market value and an equity value (equity value being the secondary value.) A life insurance policy having a death benefit value and a cash value (cash value being the secondary value.)]

Item 9 shows Feeders—Tubes that connect and pump money from a specific timeline into a respective Asset Tank. These tubes can appear or disappear from the timeline. The value of the money passing through the feeder is displayed.

Item 10 shows Drainers—Visually similar to "Feeders," these "tubes" work in the opposite direction—sucking money from a respective Asset Tank. They are often connected to a specific Wealth Eroding Factor (WEF). The value of the money passing through the drainer is displayed.

Item 11 shows Wealth Eroding Factors (WEFs)—Evil looking and acting entities that attack assets at the user's discretion, and drain them of their wealth. Based on the user's selections, WEFs can also attack income, contribution, and distribution streams.

Item 12 shows Traveling Wealth Protection Membrane—A visual entity and barrier that appears in front of an Asset Tank as it encounters a WEF. This membrane only appears if a WEF-specific defense has been designated and it will shrink or disappear according to its defensive qualities (e.g. a 100 k liability policy will disappear if it blocks a 100 k lawsuit.).

Item 13 shows Income River—This entity acts like a controlled river of money, which is directly related to an entity's income. The Income River animates the cash flow or income.

Item 14 shows Sub Tanks—Orbs filled with money that are contained within asset tanks. Used to separate different assets within asset tanks.

Item 15 shows Debt Tank—Orbs filled with money that represent one or more items of debt.

Item 16 shows Primary Timeline—The timeline that is primarily being used or focused on.

Item 17 shows Secondary Timelines—The timelines that represent alternate entities lifespan, often used to show ones parents, children or grandchildren. Often referred to as generational timelines.

Item 18 shows Movie Control Panel—A series of buttons on the movie screen that give the user the control and freedom to pause, rewind, fast-forward, zoom-in, zoom-out and experience the movie in many ways.

After the user answers a brief series of fact finding questions the CiFiCo application will instantly generate an animated representation (movie) of the financial world. Movies will contain various assets, incomes, and insurance, as well as intergenerational timelines. This will allow the user to quickly and clearly communicate a particular concept or a variety of concepts. The user will be able to demonstrate the impact of asset accumulation, distribution, taxes, insurance, investments, intergenerational transfers, and countless other concepts. The tool will allow individuals to get a unique perspective on how financial decisions they make (both in the present and future) can impact their overall financial picture (movie). CiFiCo can illustrate and factor for contributions and distributions, as well as "attacks" that may draw against someone's financial stability (e.g. death, disabilities, long term care costs, lawsuits, natural disaster, market volatility, etc.). The application can illustrate a single financial concept, compare several financial strategies, or portray a fully integrated, multi-generational, financial plan. Any financial concept, philosophy, or strategy can be communicated using CiFiCo. FIGS. 10-33 are example screen shots showing a sample animation in one embodiment of the present disclosure. The animation in one embodiment is rendered as 3-dimensional (3-D) visualization with 3-D graphical characters or elements.

The following User Flow & Process Models provide, in detail, the various data paths involved in the CiFiCo application. Specific models are developed for individual user types to identify decision points, data entry opportunities, and other various aspects of the application. The information included below only identifies the top-level abilities of each user type and does not get into application- or screen-specific functions.

Figure 3:
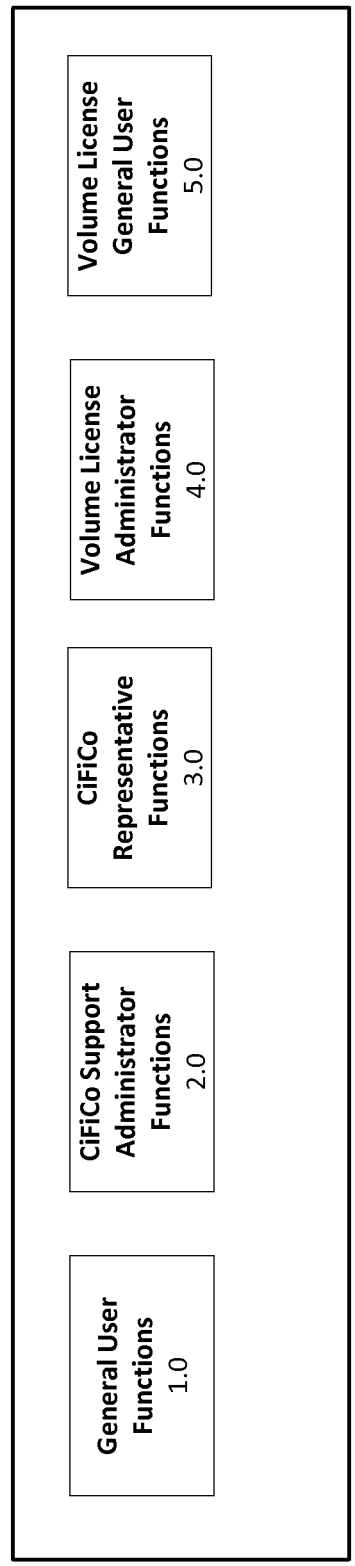
FIG. 3 illustrates five user types that the application currently accommodates.
Figure 4:
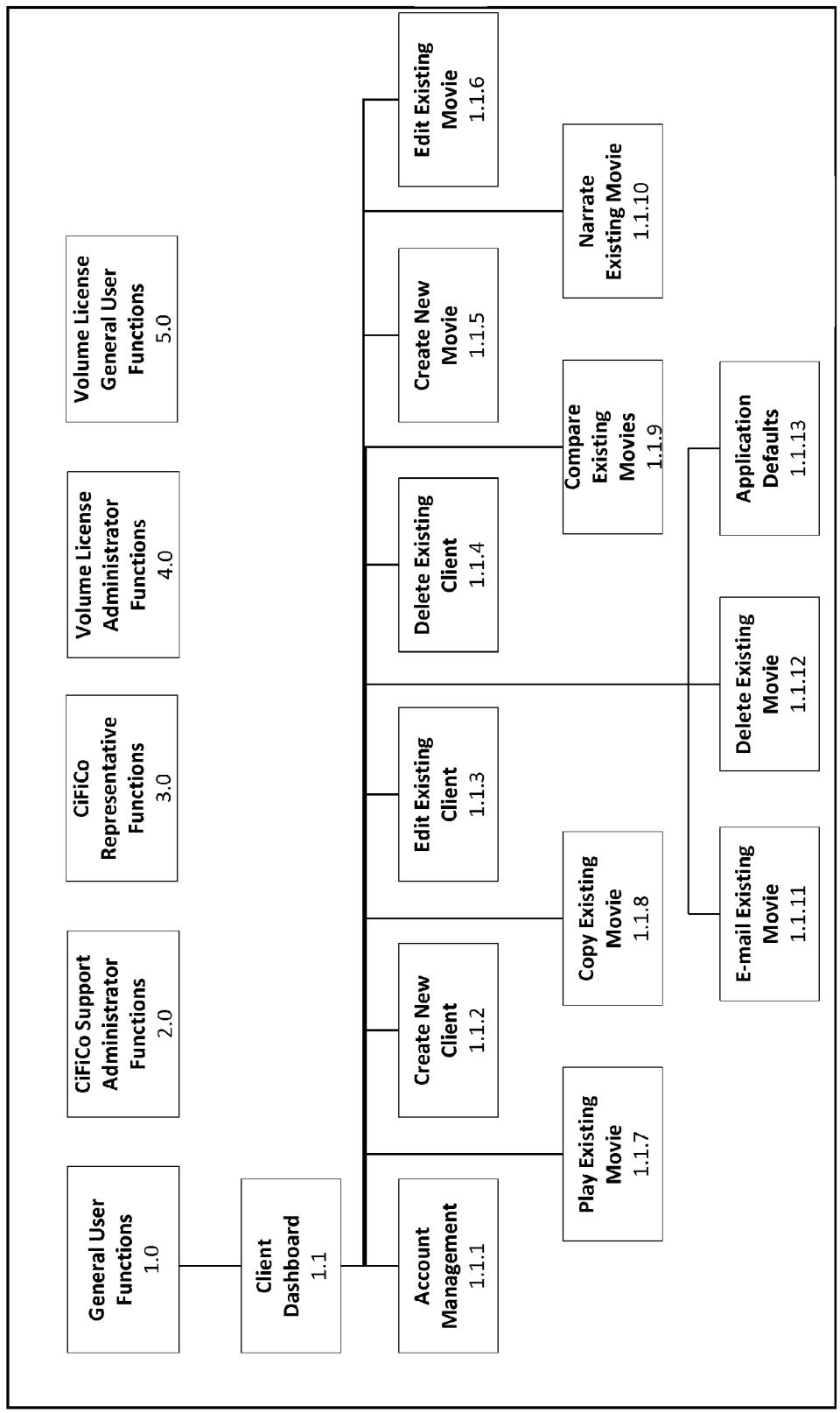
FIG. 4 illustrates default abilities that all users (General Users) will have.
Figure 5:
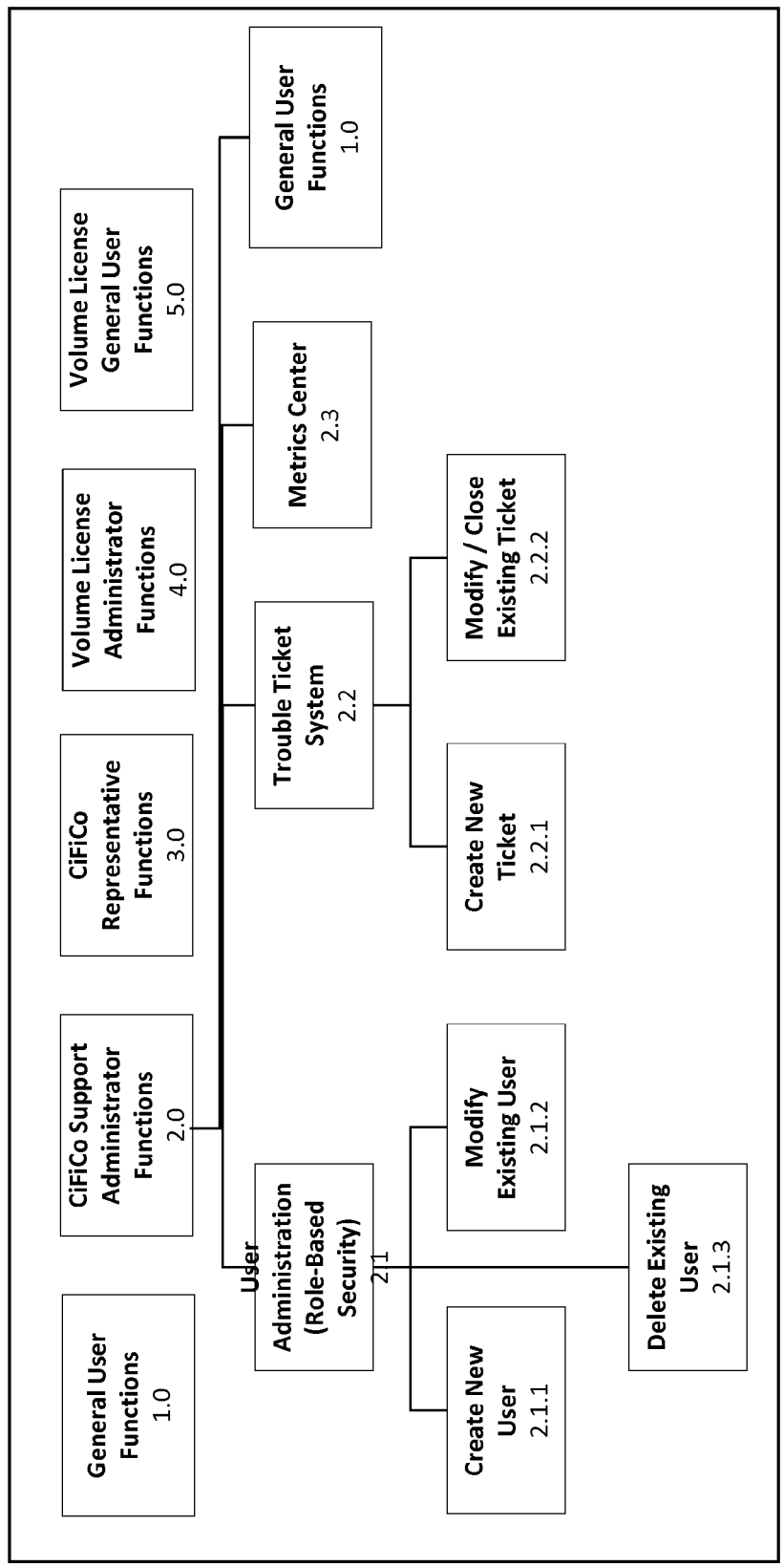
FIG. 5 shows the functional areas to which CiFiCo Support Administrators will have access.
Figure 6:
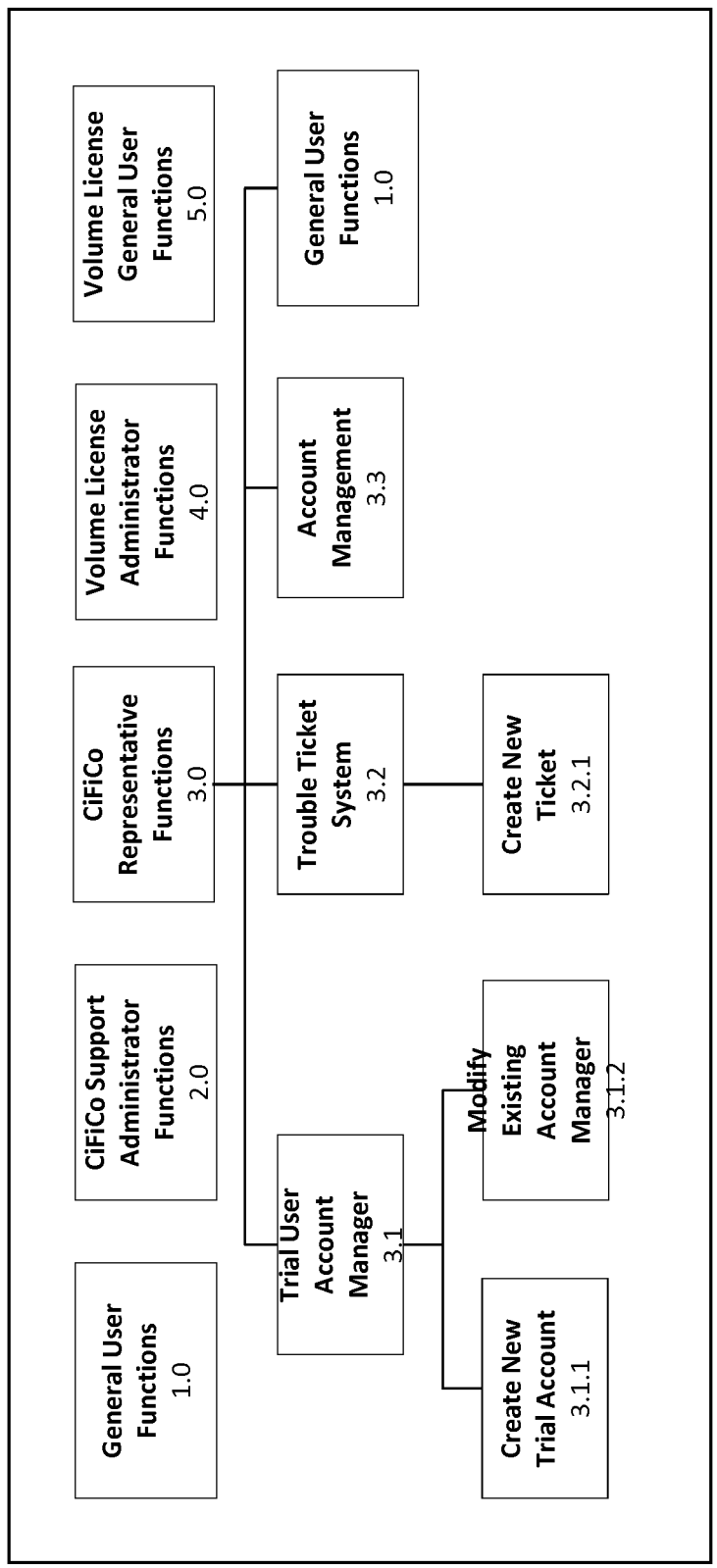
FIG. 6 shows the functional areas to which CiFiCo Representatives (e.g. sales agents) will have access.
Figure 7:
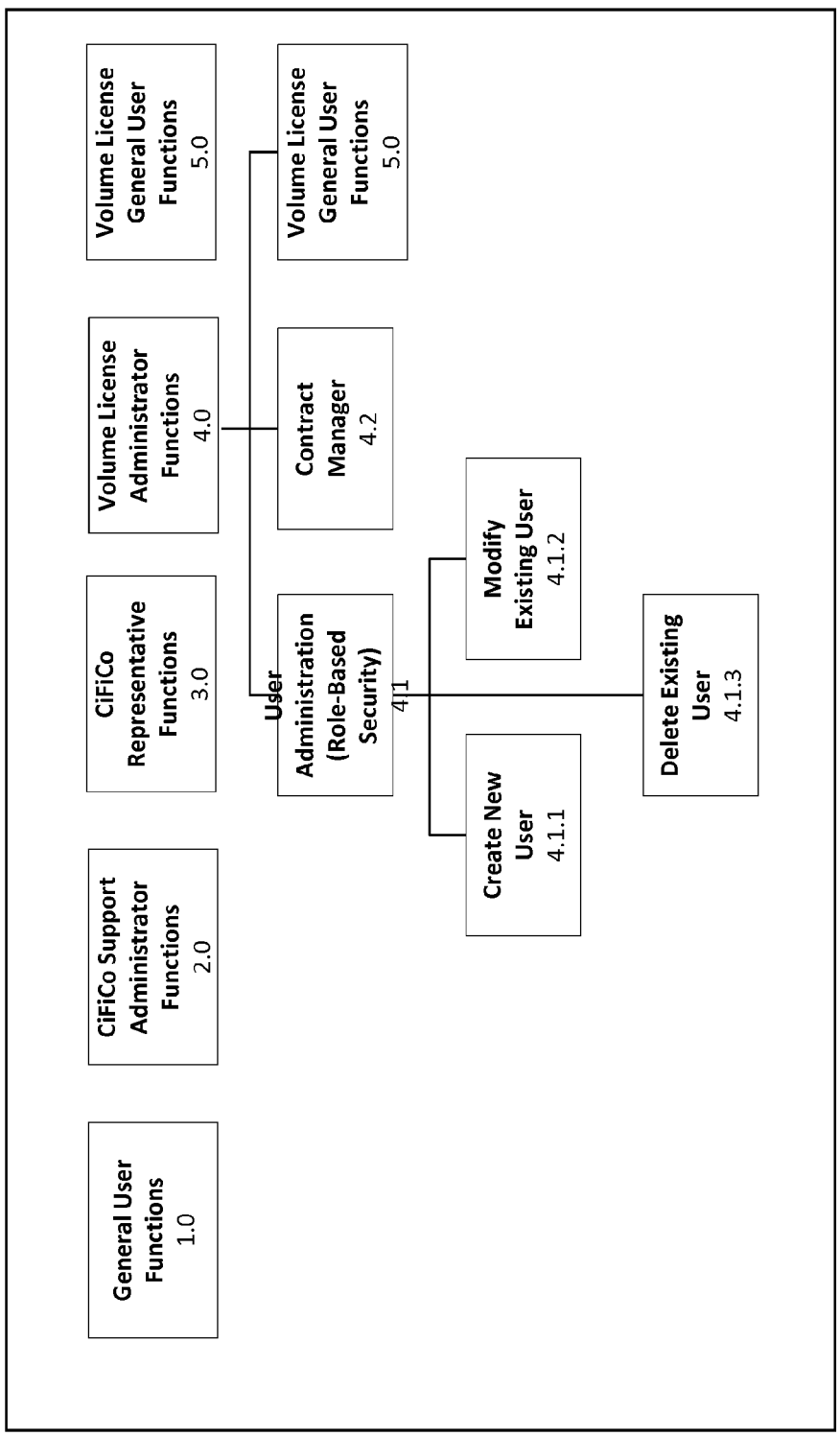
FIG. 7 shows the functional areas to which Volume License Administrators will have access.
Figure 8:
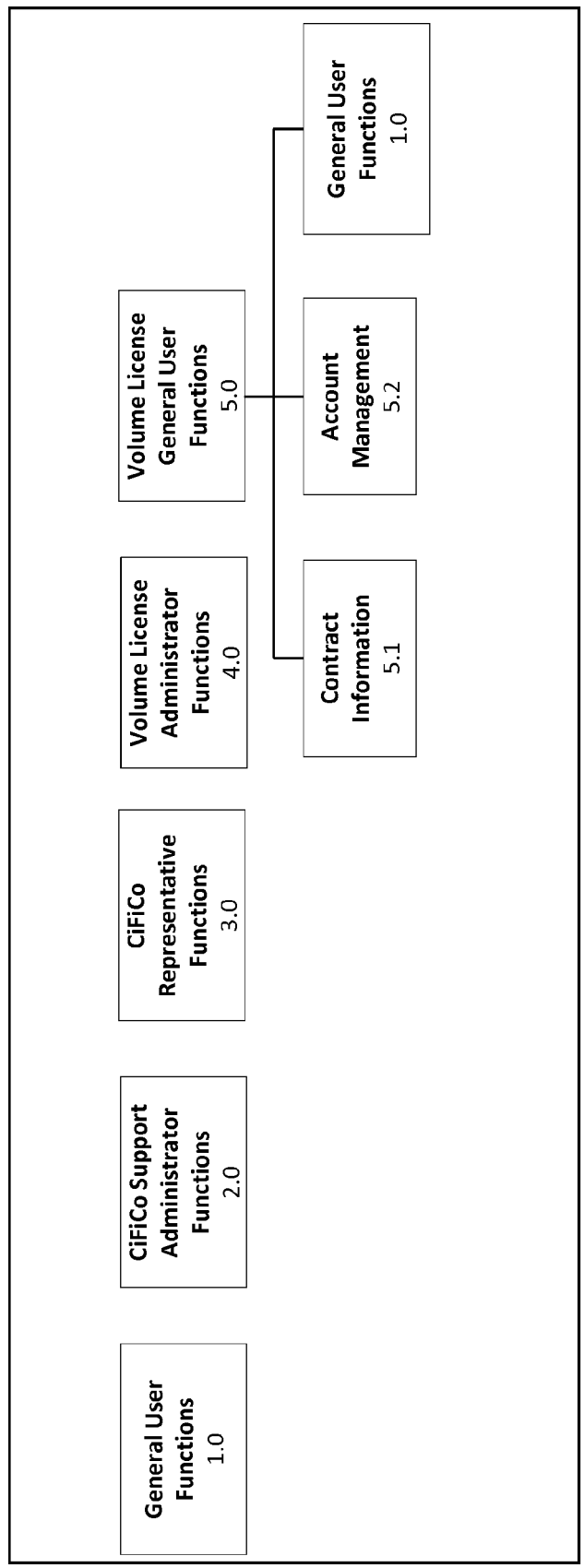
FIG. 8 shows the functional areas to which Volume License General Users will have access.

As shown in FIG. 3, the application currently accommodates five (5) specific user types, including:
  General Users
  CiFiCo Support Administrators
  CiFiCo Representatives
  Volume License Administrators
  Volume License General Users FIG. 4 illustrates default abilities that all users (General Users) will have. FIG. 5 shows the functional areas to which CiFiCo Support Administrators will have access. FIG. 6 shows the functional areas to which CiFiCo Representatives (e.g. sales agents) will have access. FIG. 7 shows the functional areas to which Volume License Administrators will have access. FIG. 8 shows the functional areas to which Volume License General Users will have access.

The following User Experience Personas provides an overview of the common and distinct user types and personas relevant to the CiFiCo application.

The CiFiCo user base consists of four (4) distinct user types. The four (4) distinct user types include: (a) Beginning User; (b) Basic User; (c) Advanced User; (d) Super User.

It is assumed that users will progress through the user ranks (starting with Beginning User and advancing to Super User) as their comfort level increases. A direct correlation can be made between a user's comfort level and the total number of movies they have created—the more movies a user creates, the more comfortable they are with the application; the more comfortable they are with the application, the more they are willing to "experiment" with additional application variables and actions. The overall level of comfort is assumed to follow the schedule below:
  Beginning User—1-3 movies created
  Basic User—4-10 movies created
  Advanced User—11-20 movies created
  Super User—more than 20 movies created Finally, it is also assumed that most users will remain in the Beginning User/Basic User category, regardless of the total number of movies they have created or their overall comfort level with the application. This is because we assume 85-90% of all users will always look for the easiest and most direct way to create a client movie; entering the minimum amount of data necessary to produce an effective movie—one in which they can open or further a dialog between themselves and their client.

Beginning User: Beginning Users will use the basic functions of the application and often stay to the predefined user path we set to enter different variables, rarely straying from the required elements necessary to produce their first few movies. These users will probably not enter more than one (1) or two (2) 'Prior' or 'Next' generation members. They are mostly just testing out the functionality of the application and trying to determine their level commitment to CiFiCo and whether or not they will incorporate it into their day-to-day operations. These users will rarely edit or create a new movie in front of a client and may require help and/or assistance from time-to-time. The Beginning User may try one (1) or two (2) WEFs, but will not experiment beyond the common types. These users will spend no more than 5-7 minutes on a single movie.

Basic User: Basic Users are those users who have developed a few movies and have an understanding of the steps necessary to create a client movie, but do not fully understand all of subtle nuances of the application. These users are starting to experiment with editing existing movies and adding multiple 'Prior', 'Next', and 'Lower' generation members, but are not tapped into the application's full potential. These users will also experiment with different types of Nest Egg Accounts, but don't fully understand the power of a Miscellaneous Account or the fully abilities of the 'Master Ins & Outs'. The Basic User may insert a few different WEFs, but will typically leave them to the most common types. The user may attempt to edit a movie in front of a client, but do so with limited success. These users will spend an average of 5-10 minutes preparing a single movie.

Advanced User: Advanced Users have created multiple movies, edited a few existing ones, and may have experimented with duplicating techniques. The Advanced User understands the various controls found throughout the application and has found success in following our pre-defined user path as well as their own actions, but has not yet tapped into the power of the Narrate function, or the subtle controls found throughout the application, including the Volatility Meter, color modifications on the movie player, zoom and selective zoom controls, and other user preferences. The Advanced User will begin to use some of the advanced controls, included Amortization Tables, Table Entries, and Reverse Mortgage Calculators, but has not yet mastered them. Advanced Users will find it easy to create a movie in under 2 minutes. These users will spend an average of 5-10 minutes preparing a movie and another 5 minutes tweaking various aspects on a final playback. Advanced Users will also begin to experiment with the 'Narrate' controls and spend time editing existing movies with this "new" feature.

Super User: The Super User has mastered the various controls, inputs, and preferences the application offers to create a movie and edit or narrate an existing movie. The user will have full understanding of the cause-and-effect relationships between various input controls found throughout the application and begin to make conscious decisions ahead of time, before they place them into the application. These users have started to use some of the advanced controls, included Amortization Tables, Table Entries, and Reverse Mortgage Calculators, but have not defined their own application and/or movie defaults. Super Users will find it easy to create a movie in under 2 minutes. These users will spend an average of 5 minutes setting their application and/or movie defaults, 5-10 minutes preparing a movie and another 5-10 minutes tweaking various aspects on a final playback.

Figure 9:
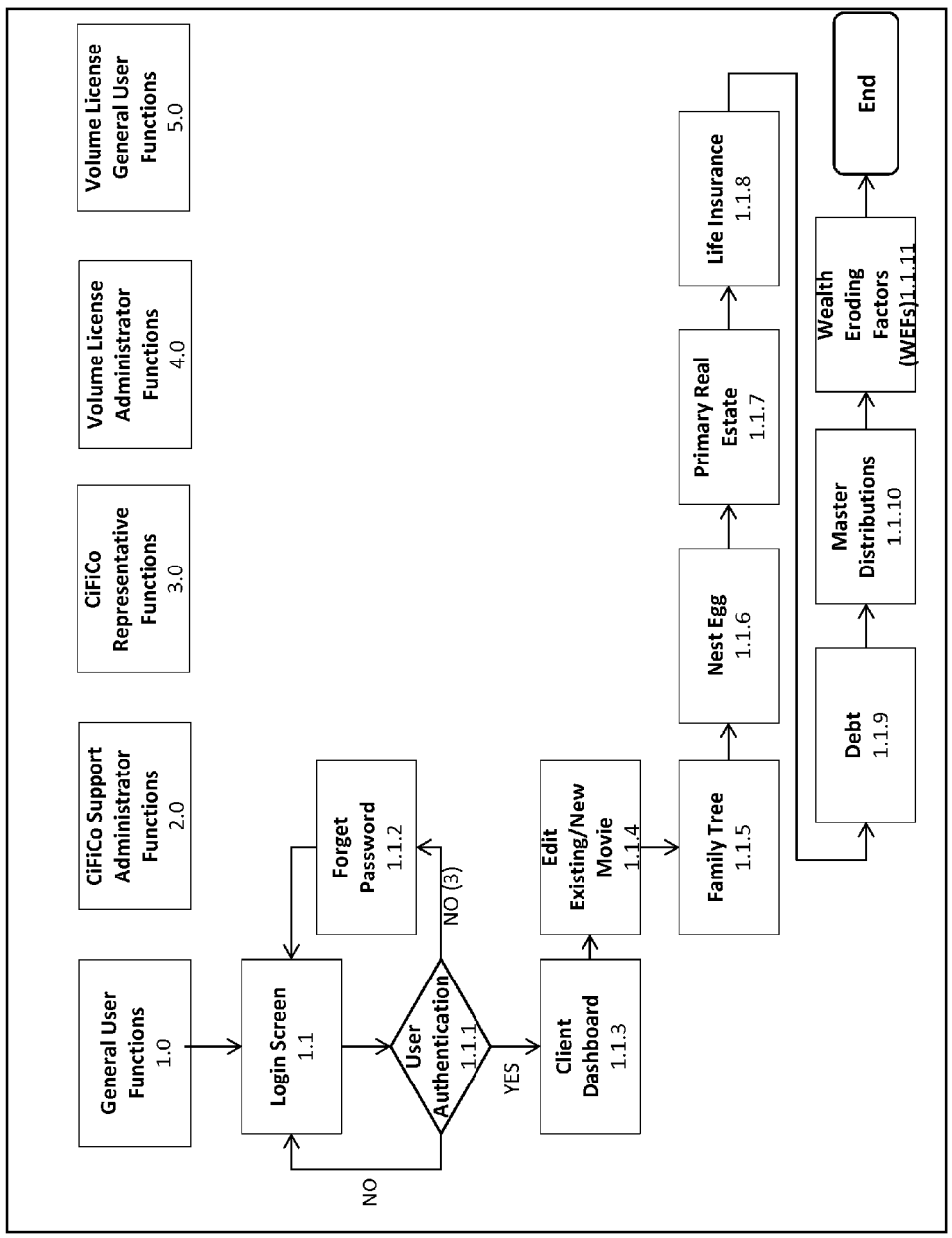
FIG. 9 is a flow diagram illustrating an example pre-defined user path that a user may follow.
Figure 12:
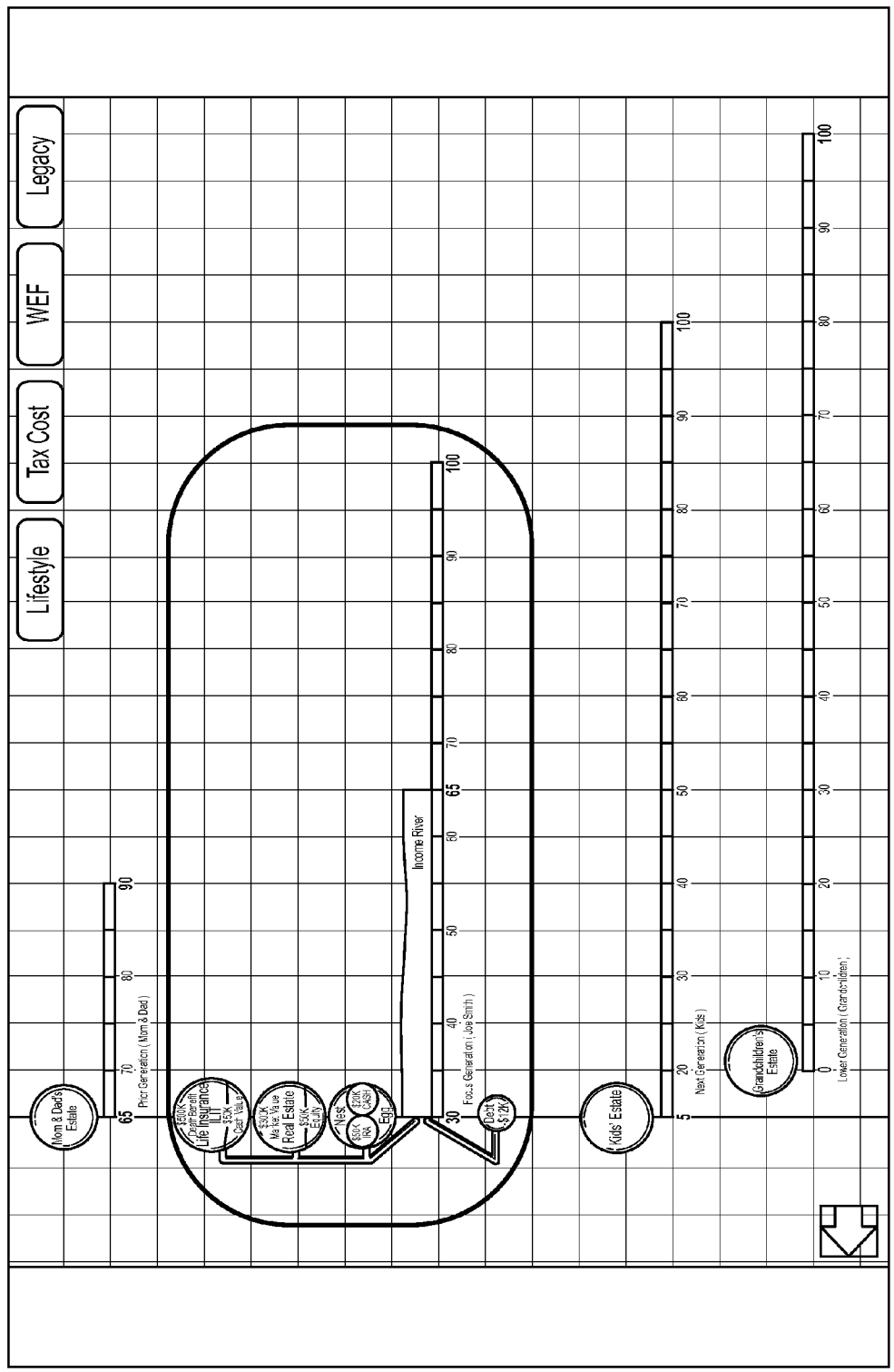
Figure 13:
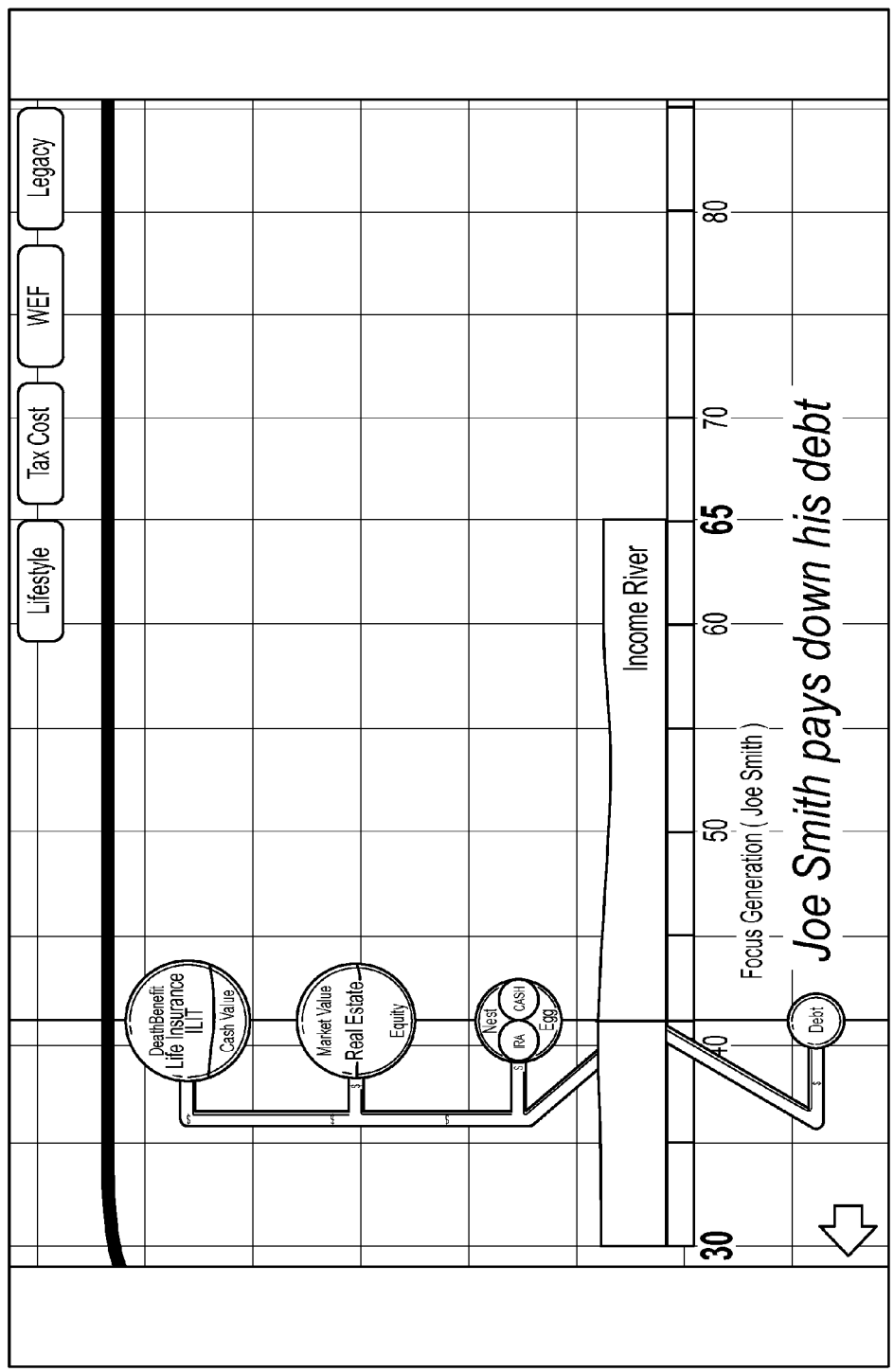
Figure 14:
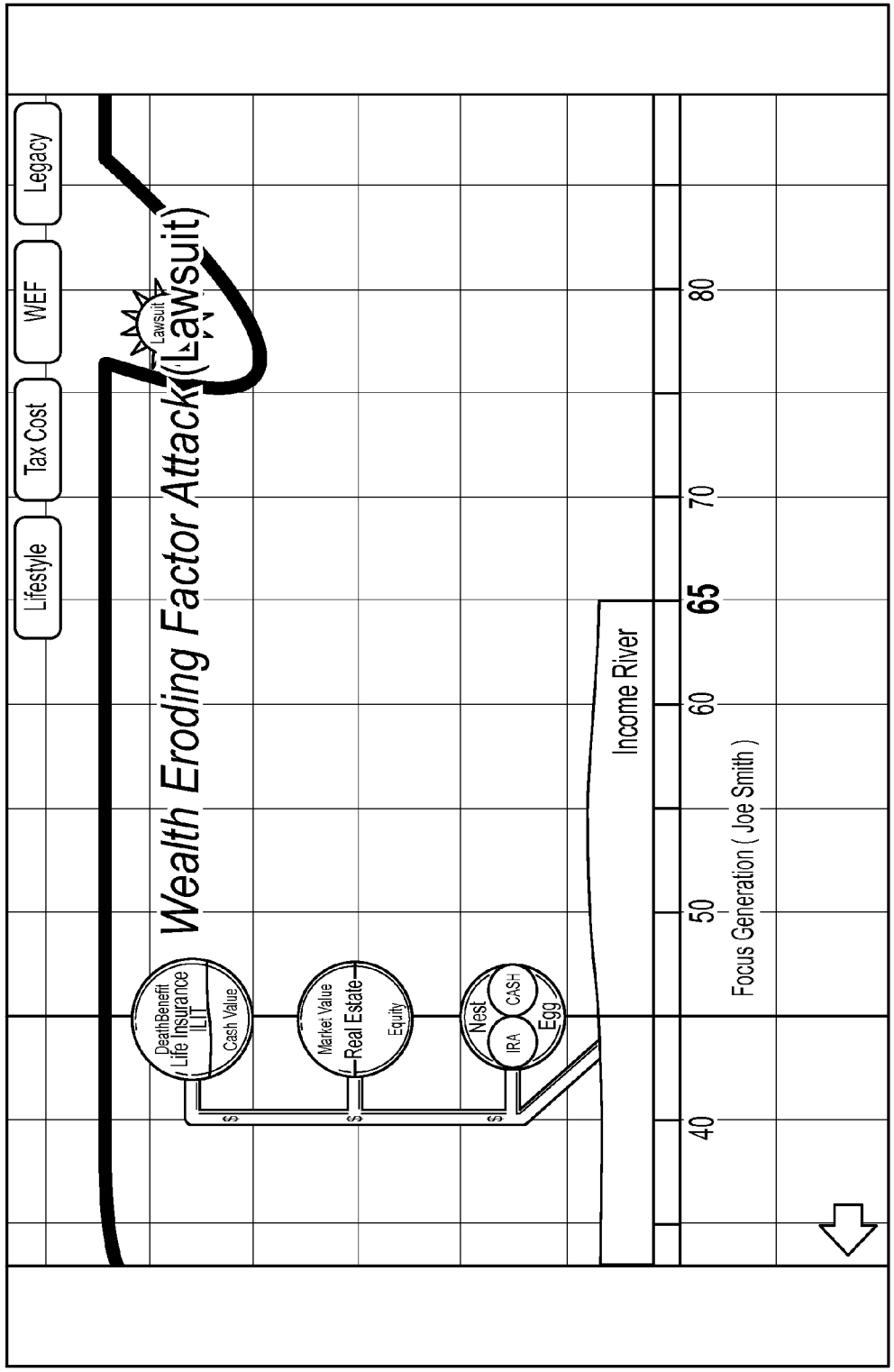
Figure 15:
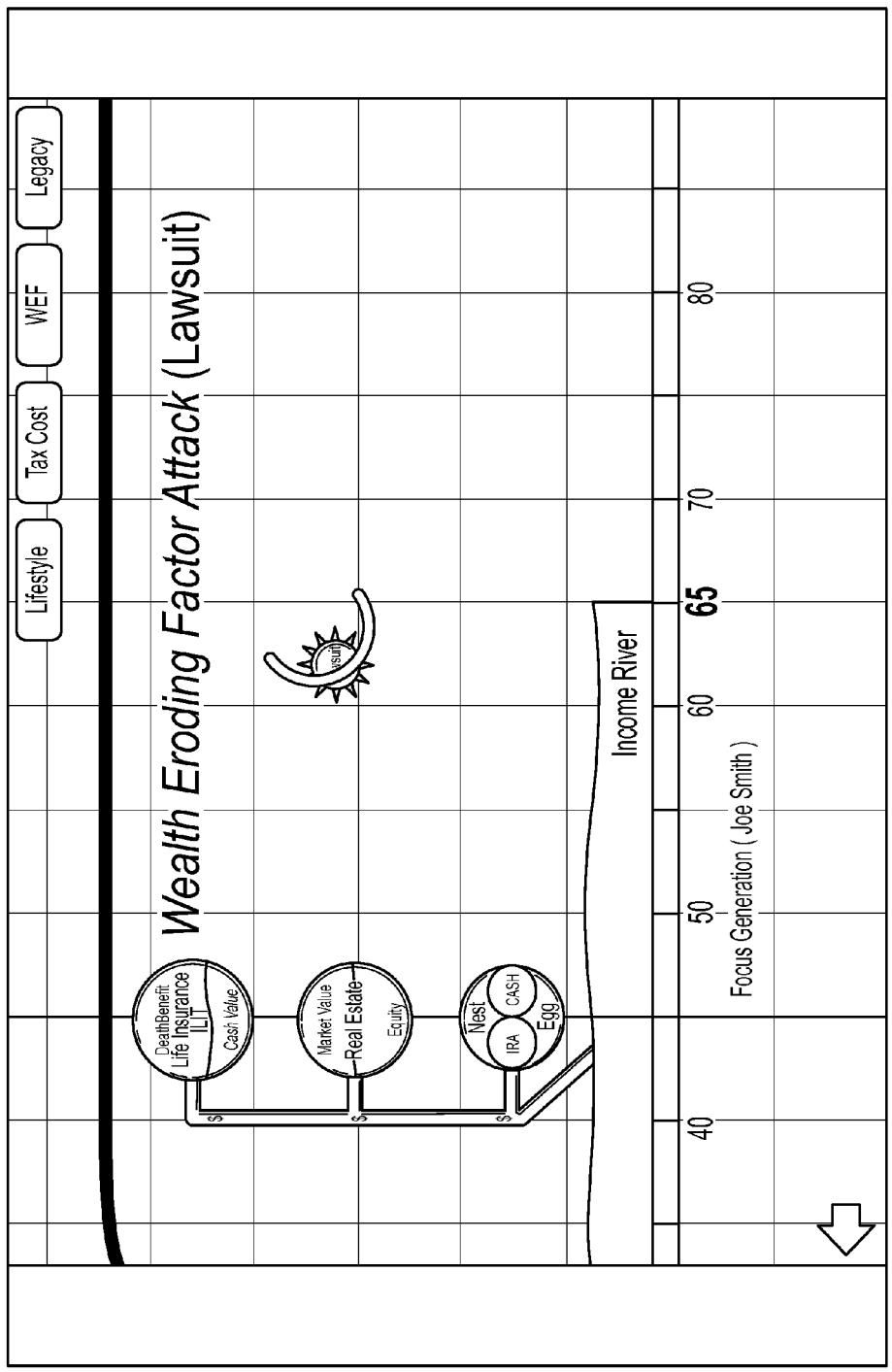
Figure 16:
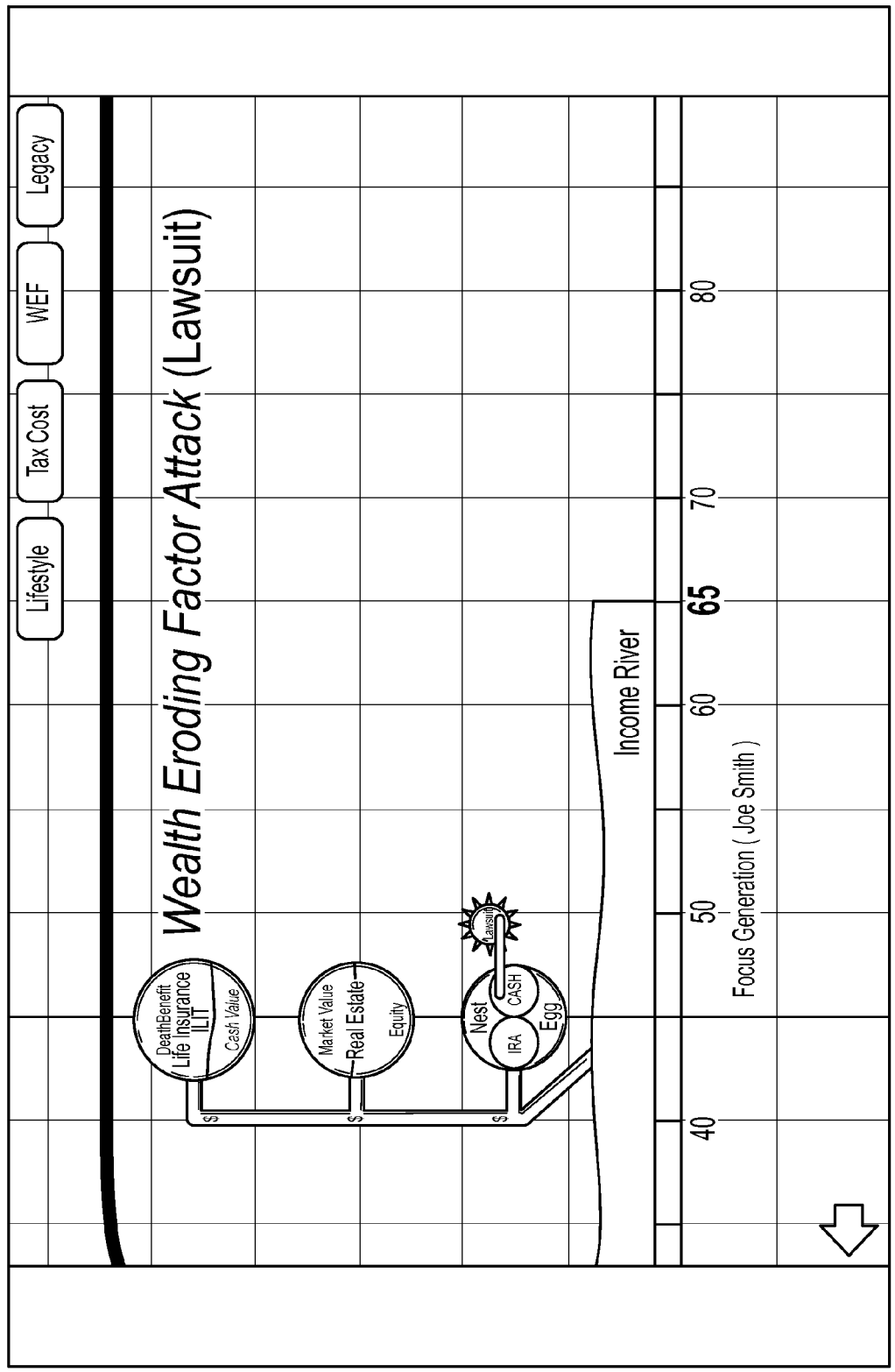
Figure 17:
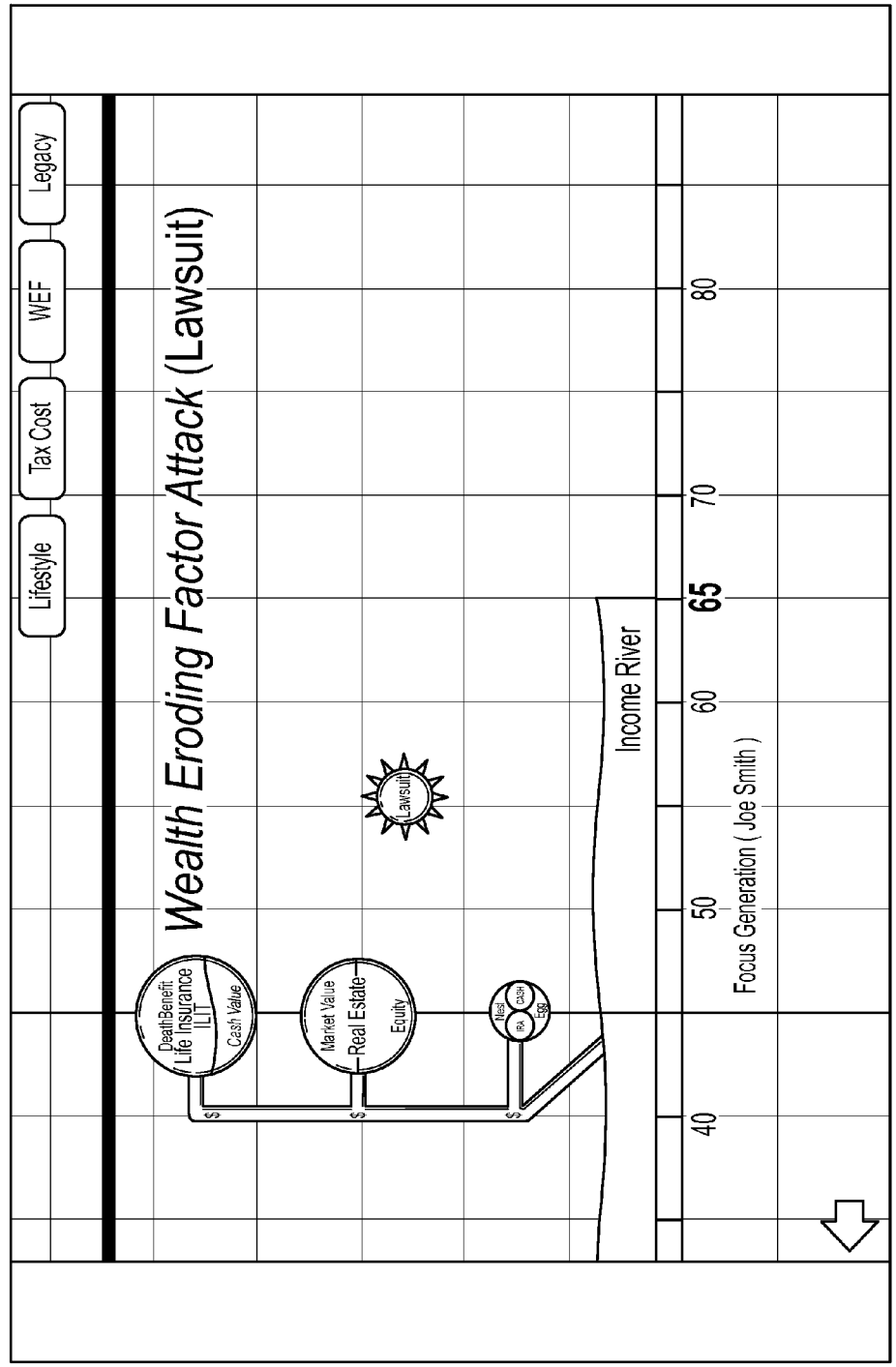
Figure 18:
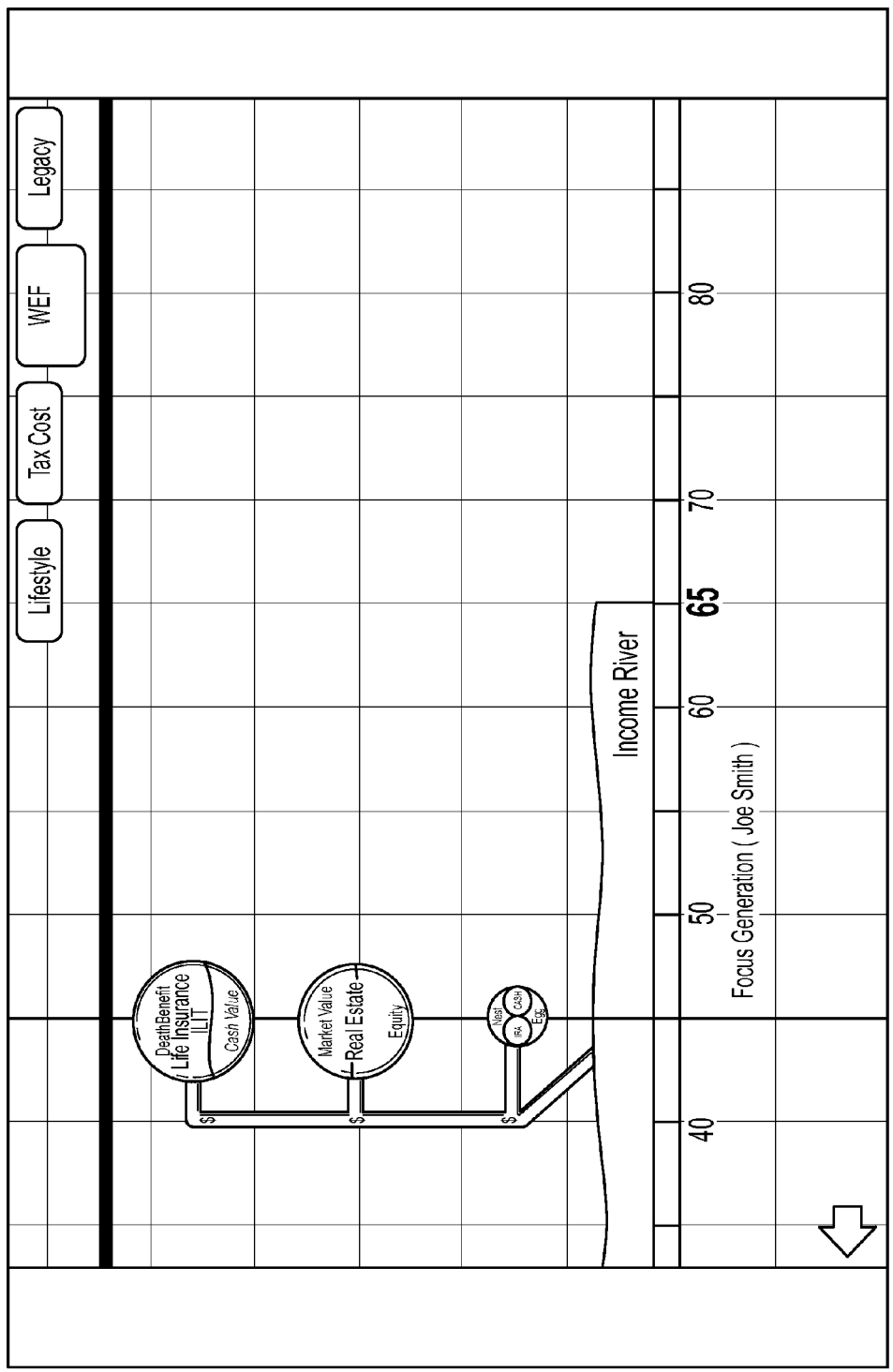
Figure 19:
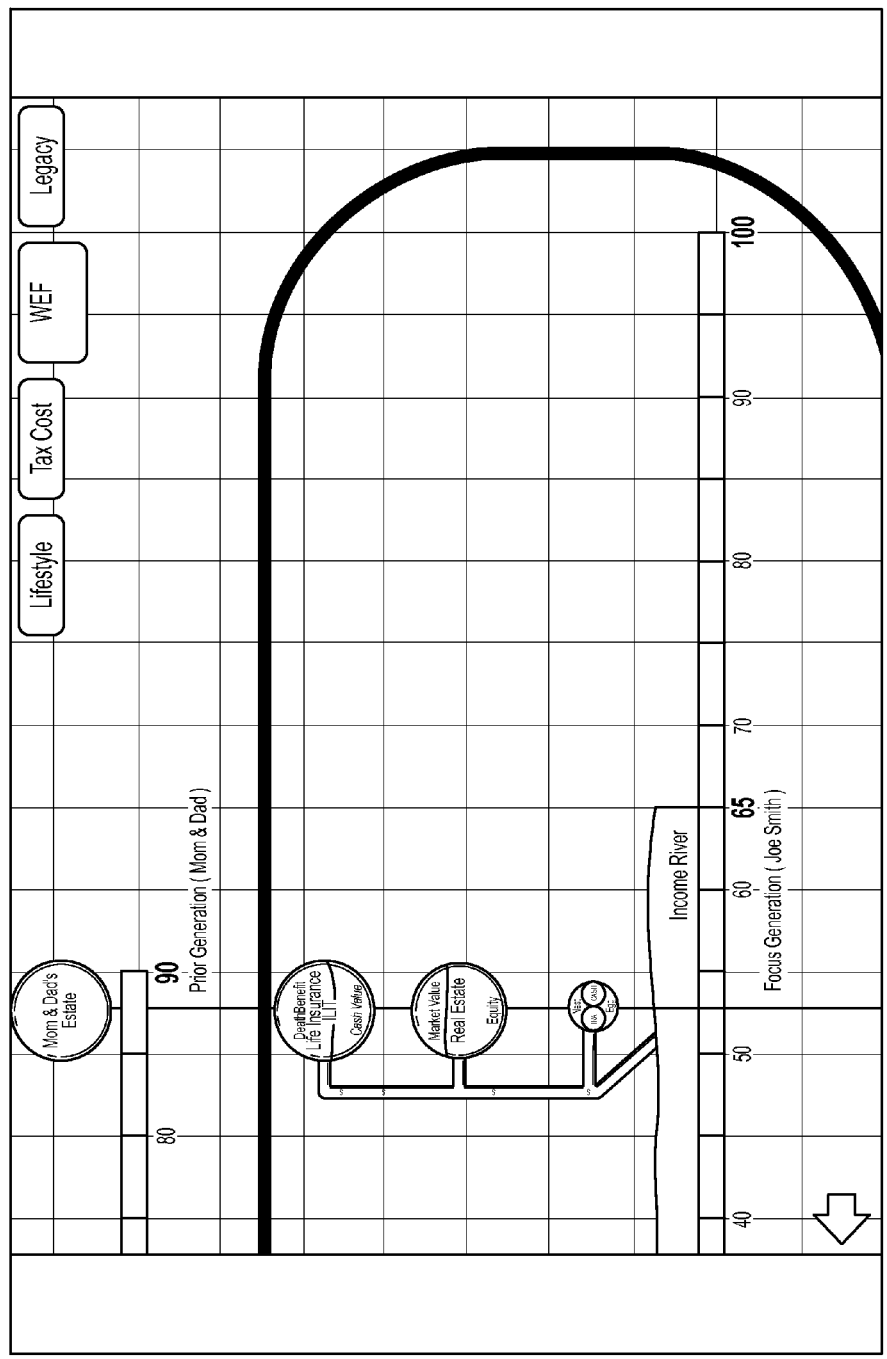
Figure 20:
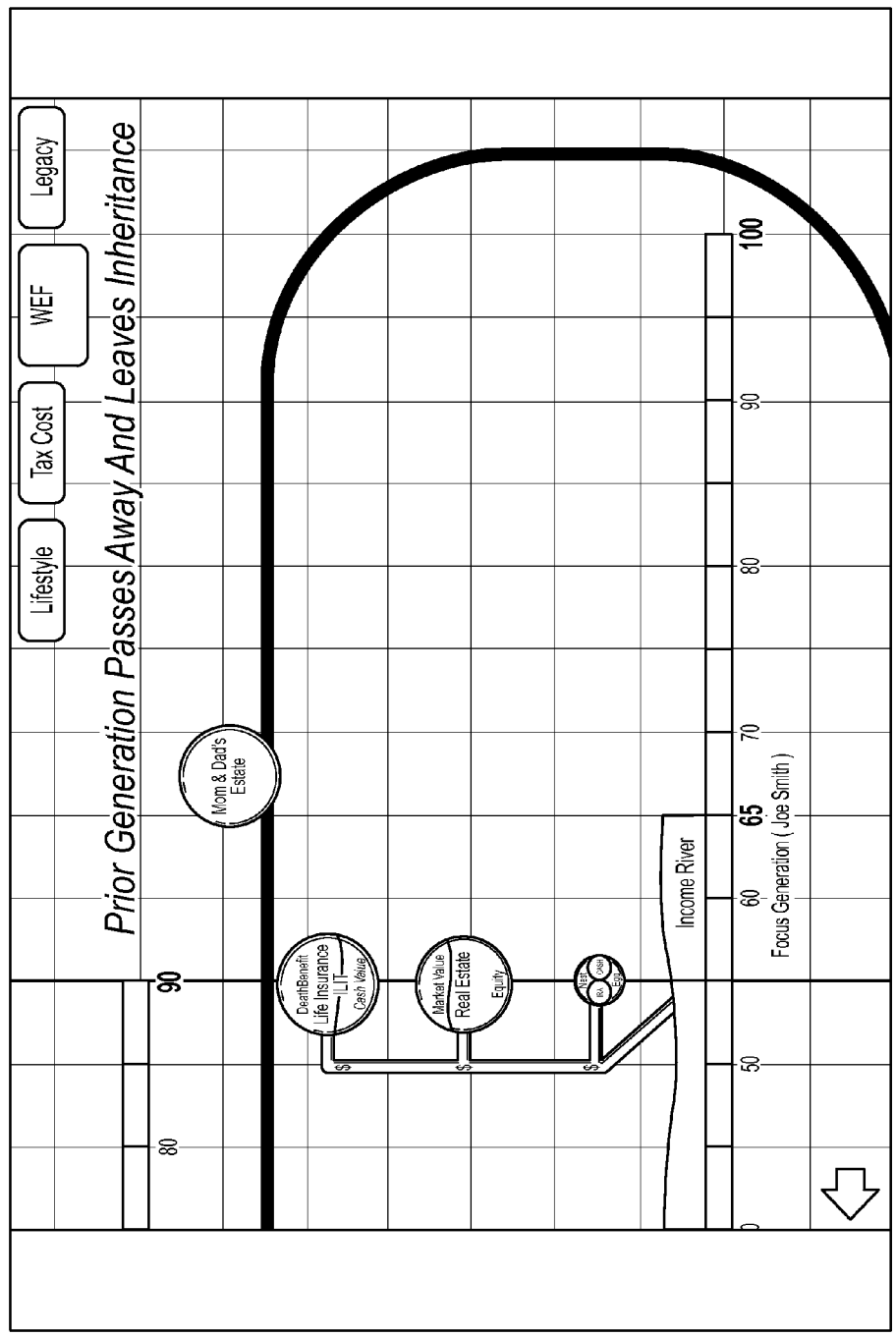
Figure 21:
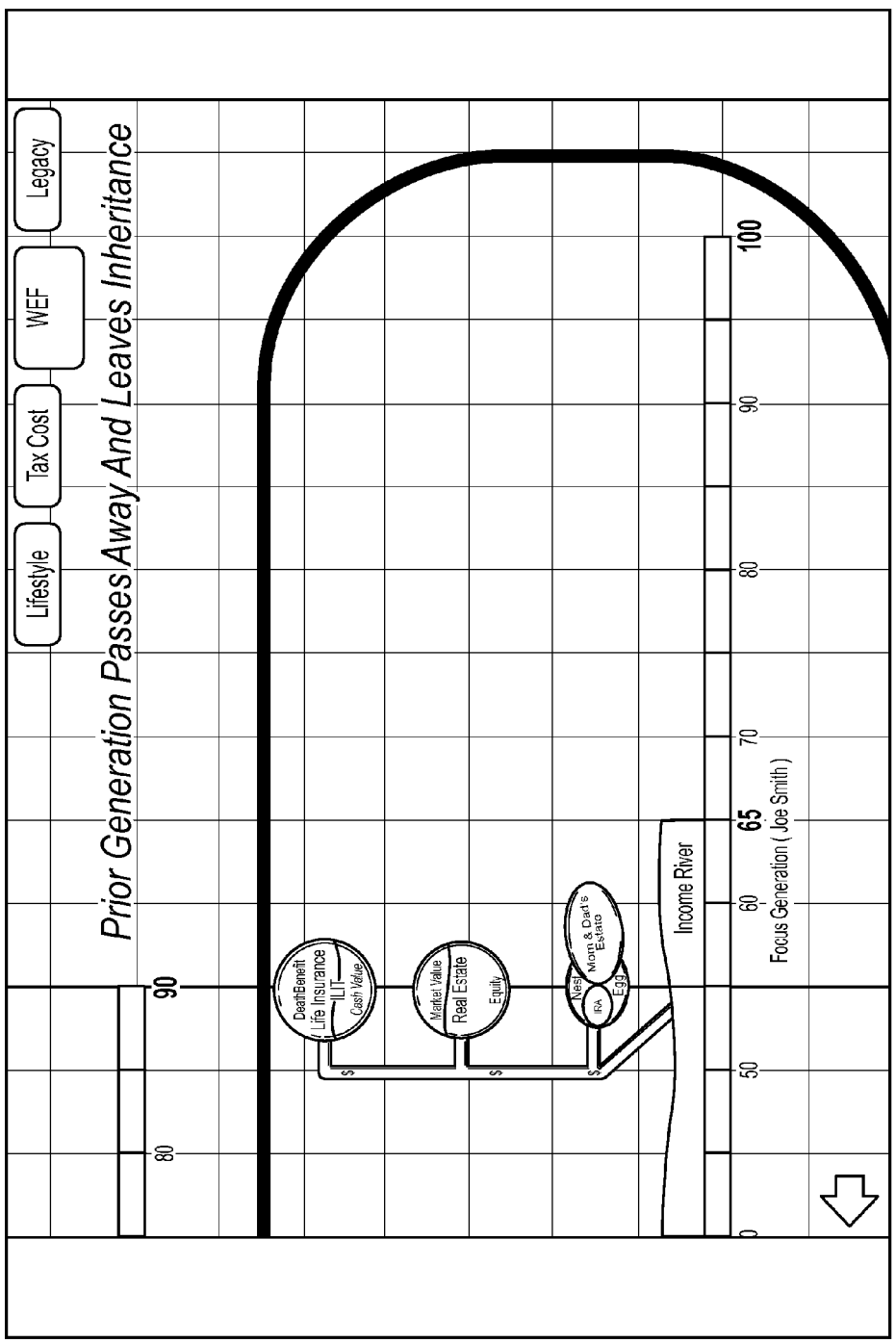
Figure 22:
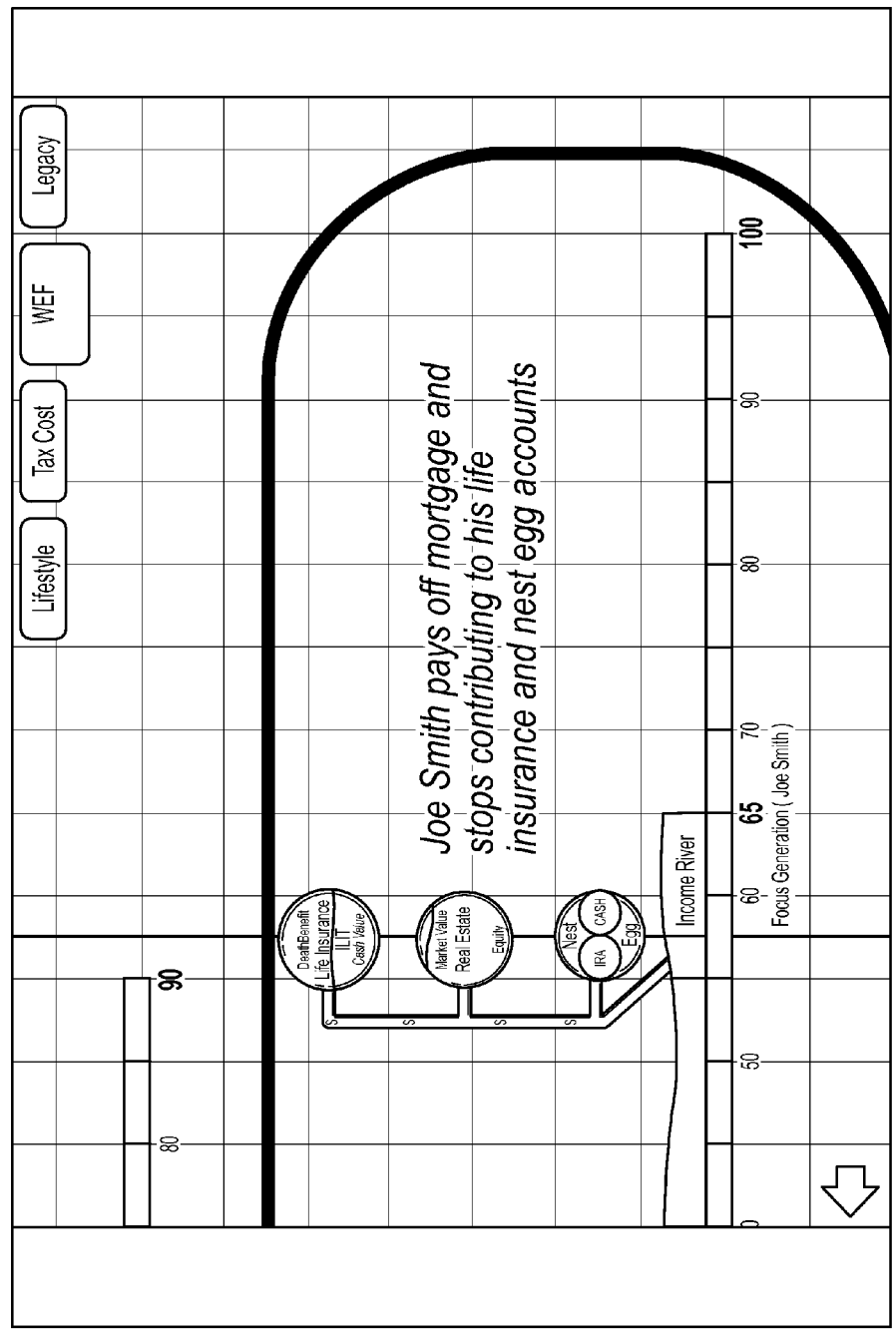
Figure 23:
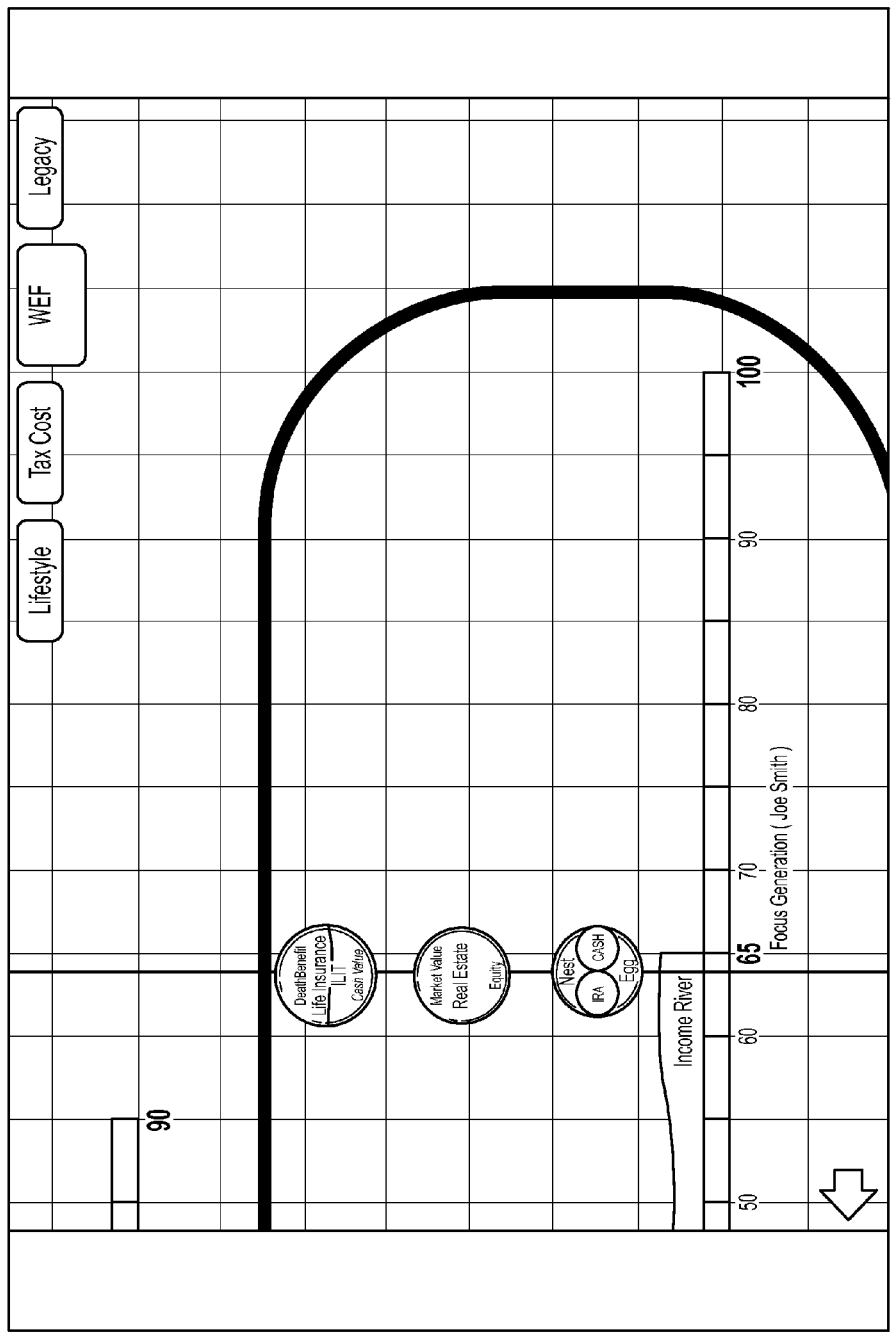
Figure 24:
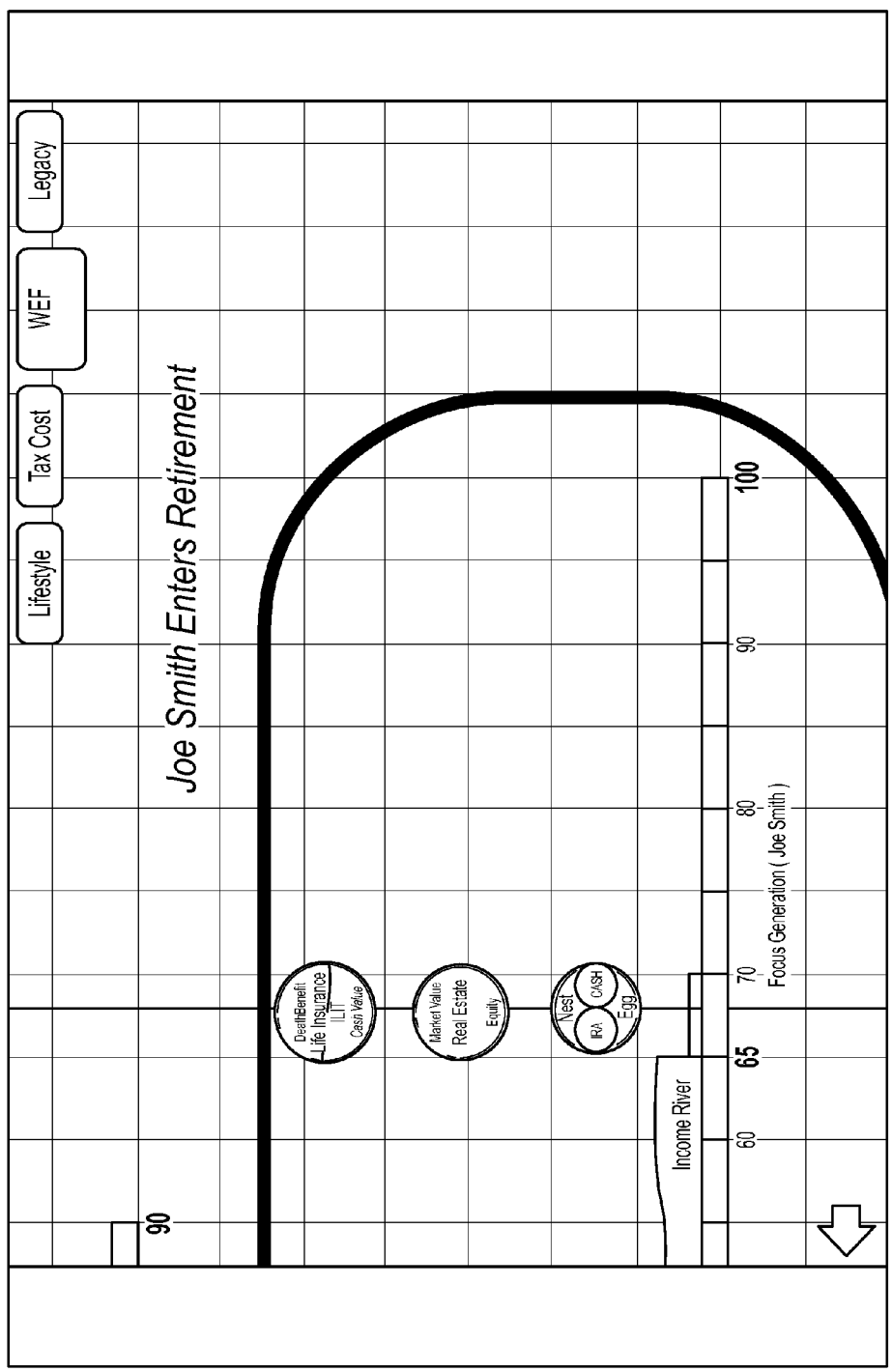
Figure 25:
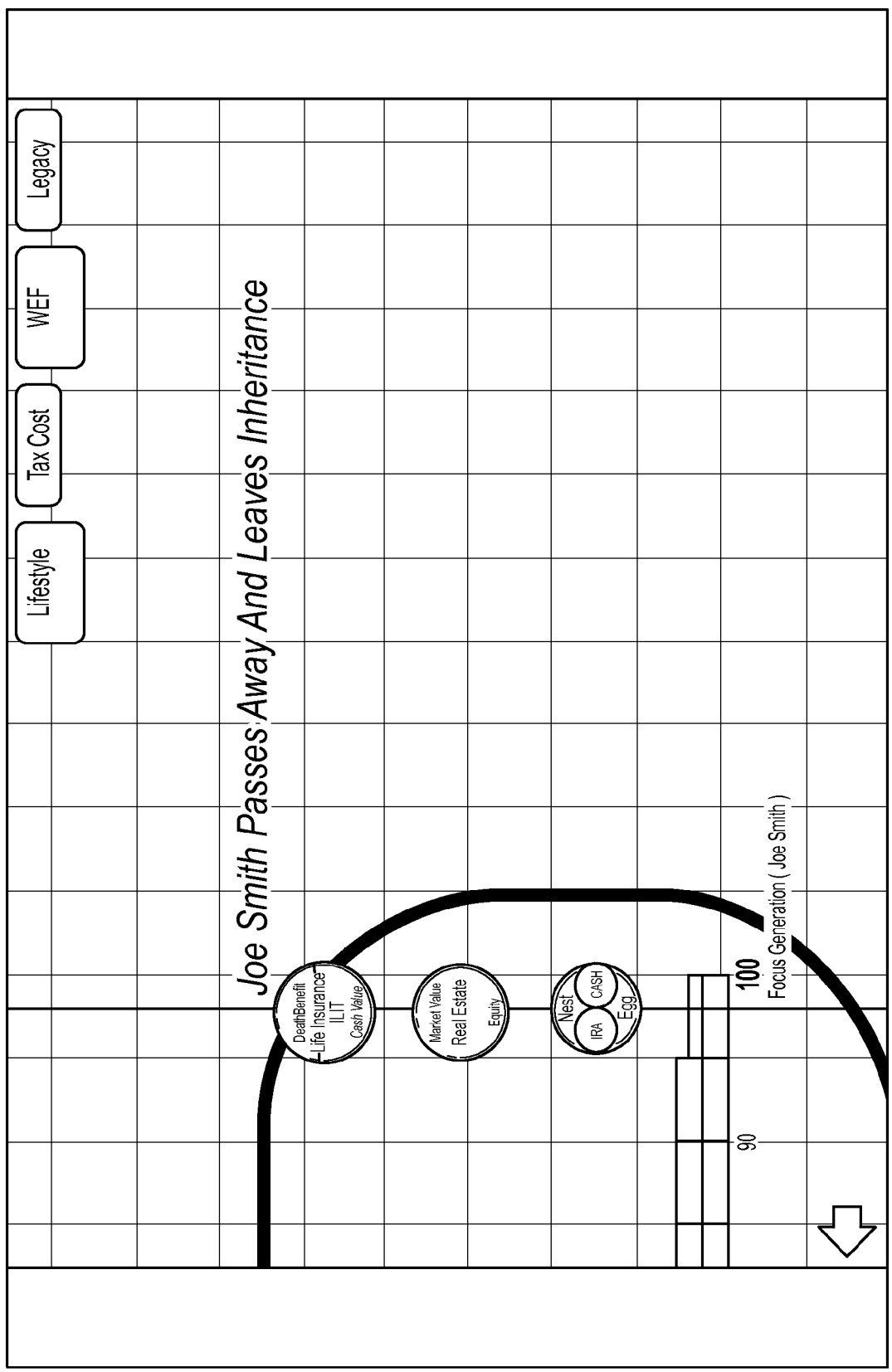
Figure 26:
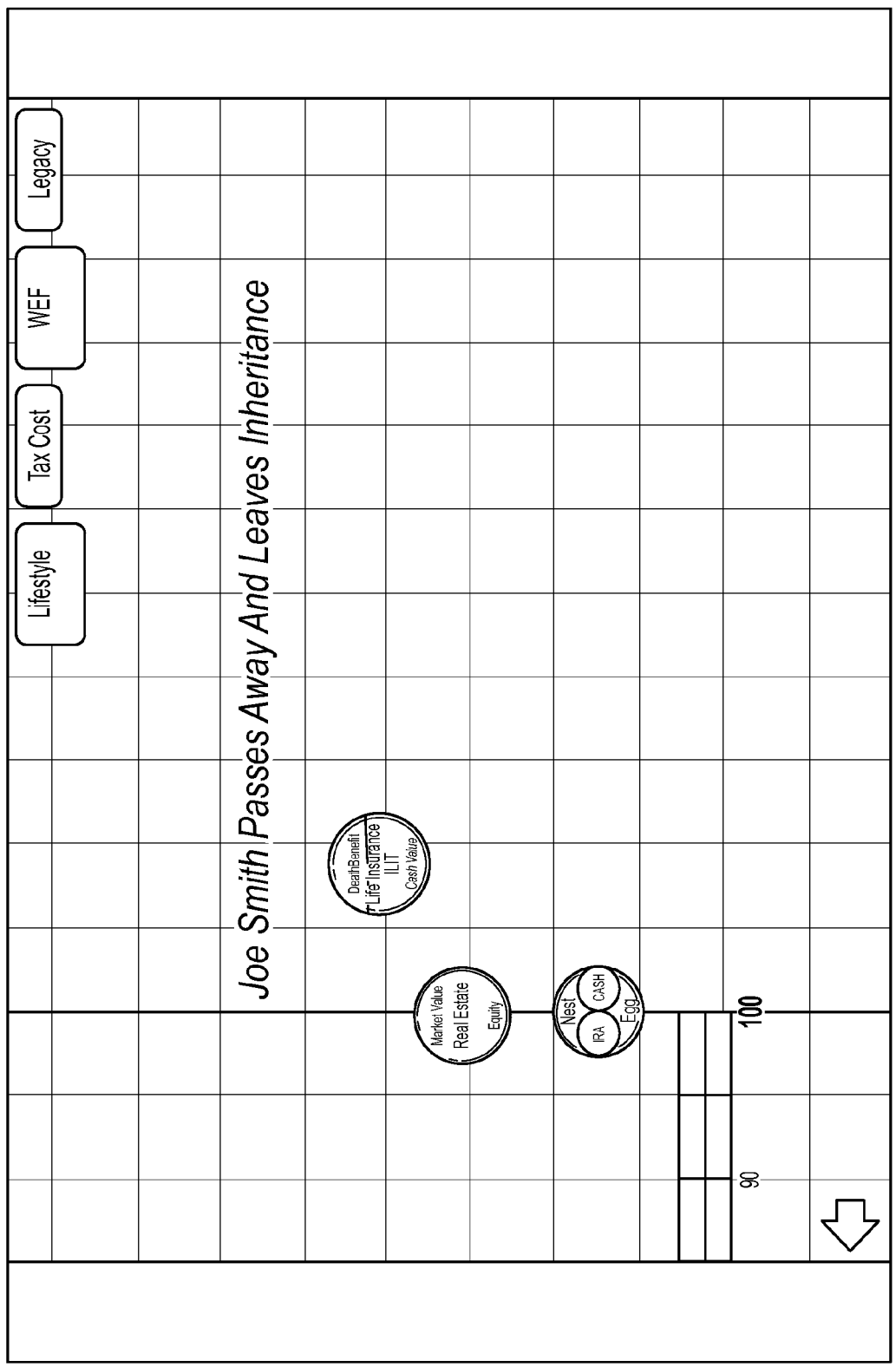
Figure 27:
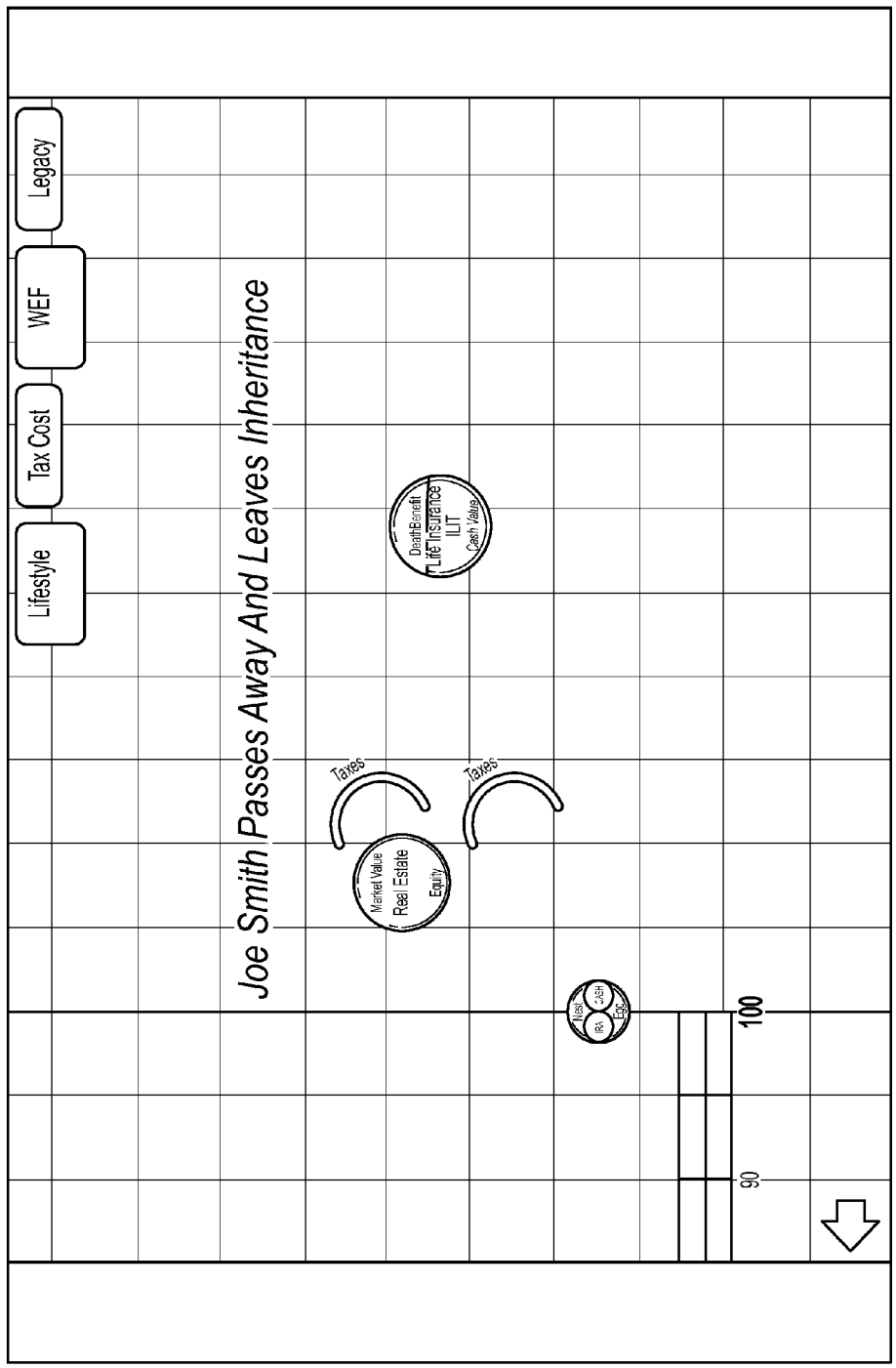
Figure 28:
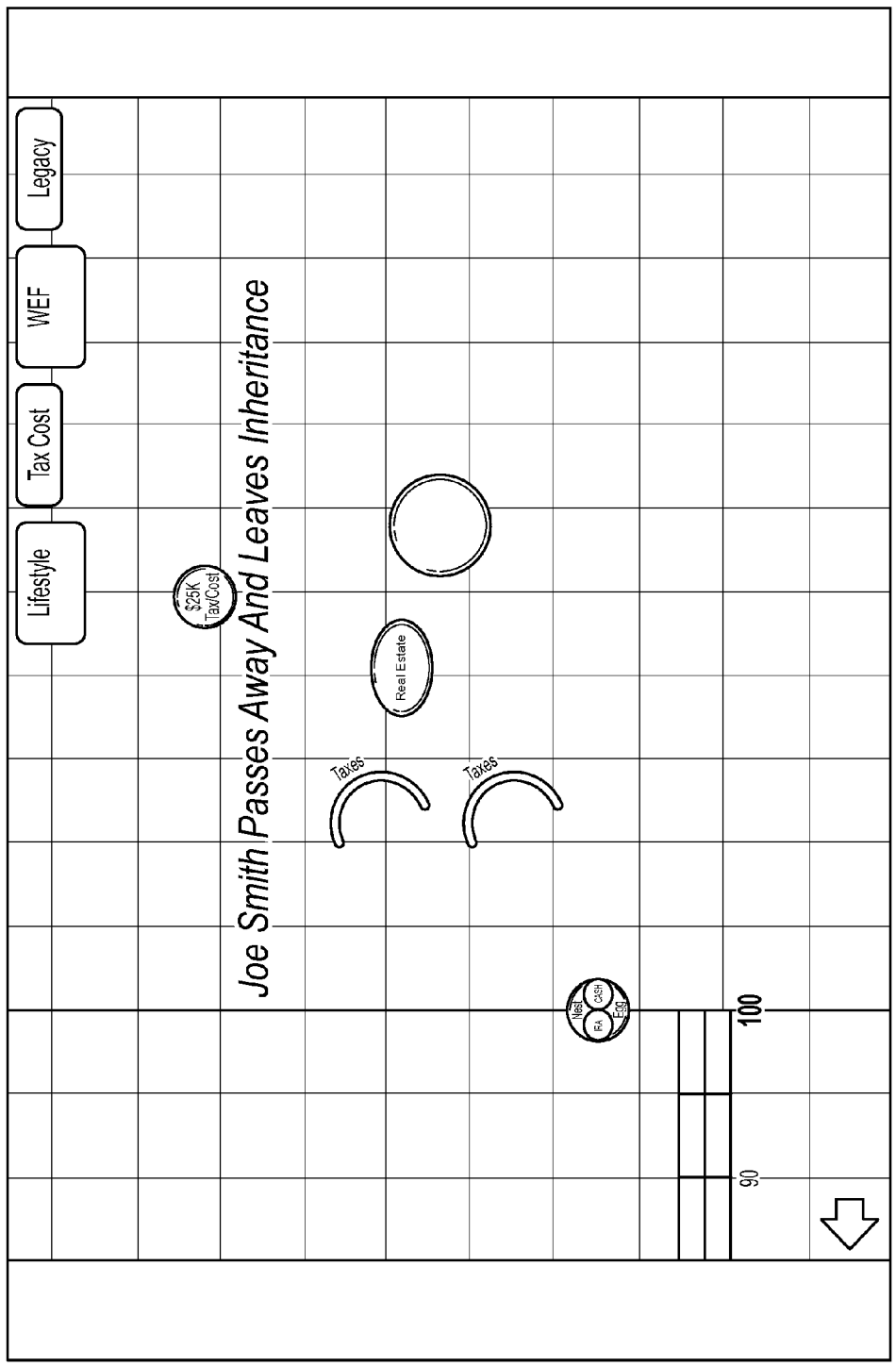
Figure 29:
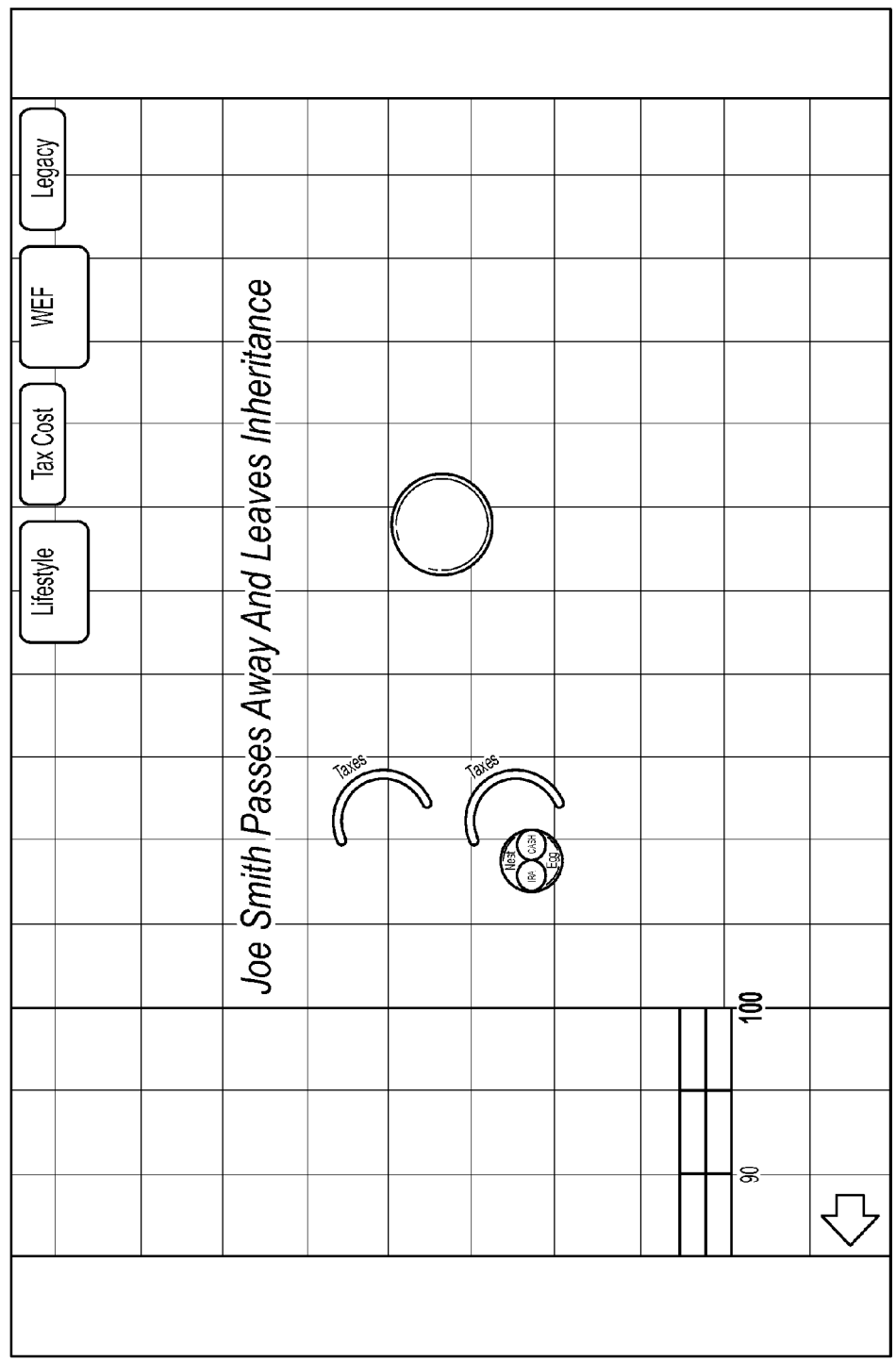
Figure 30:
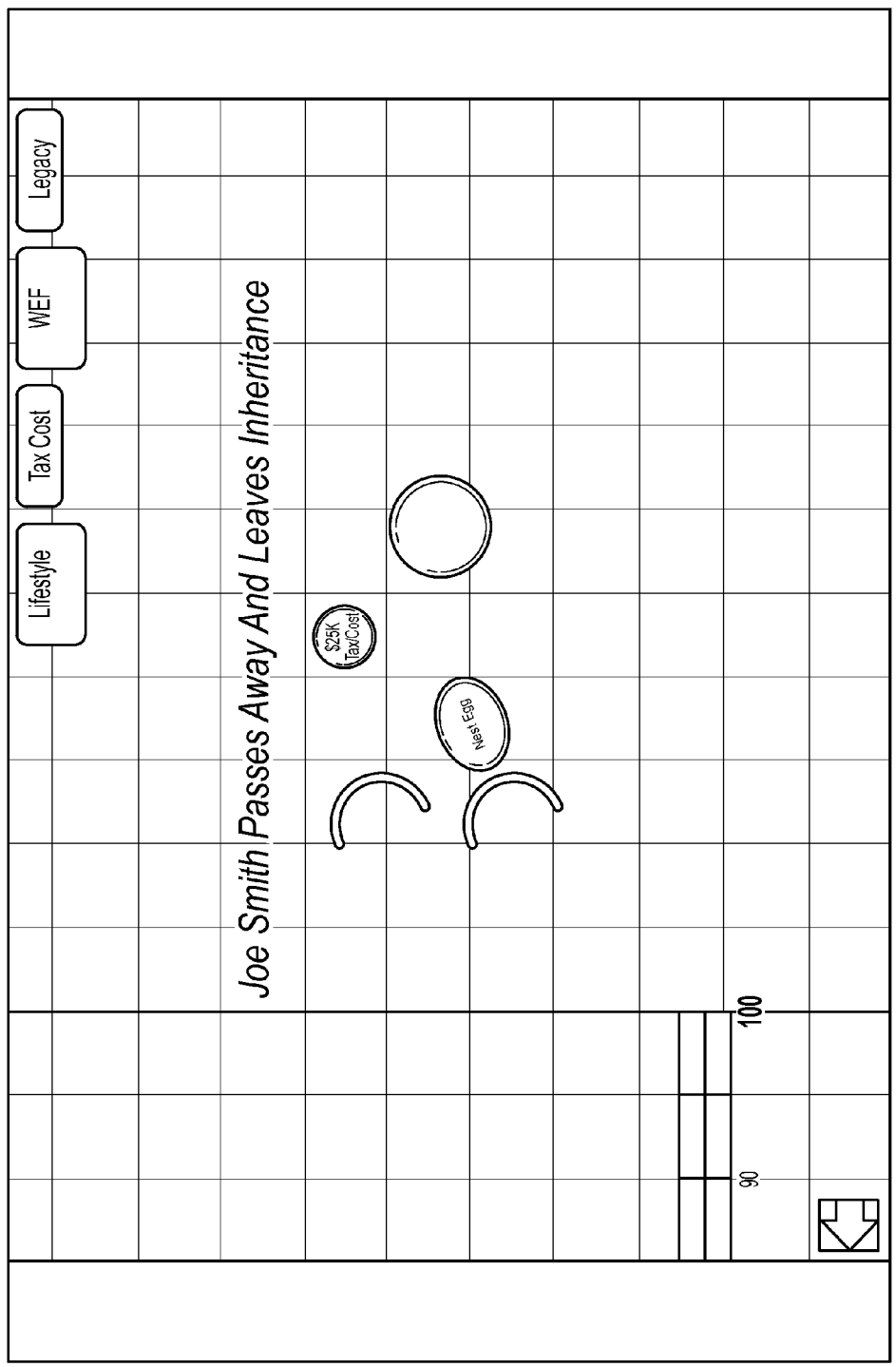
Figure 31:
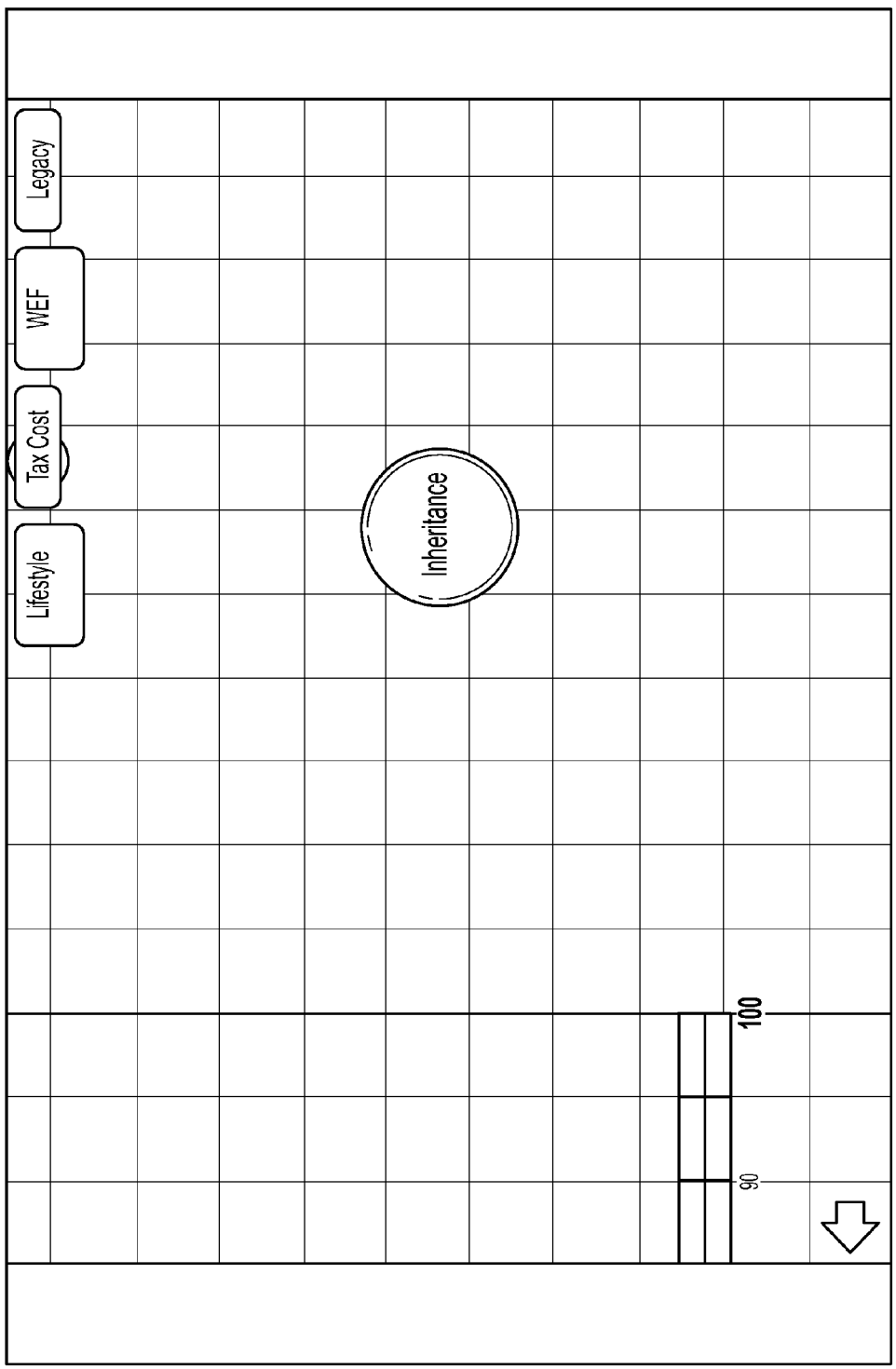
Figure 32:
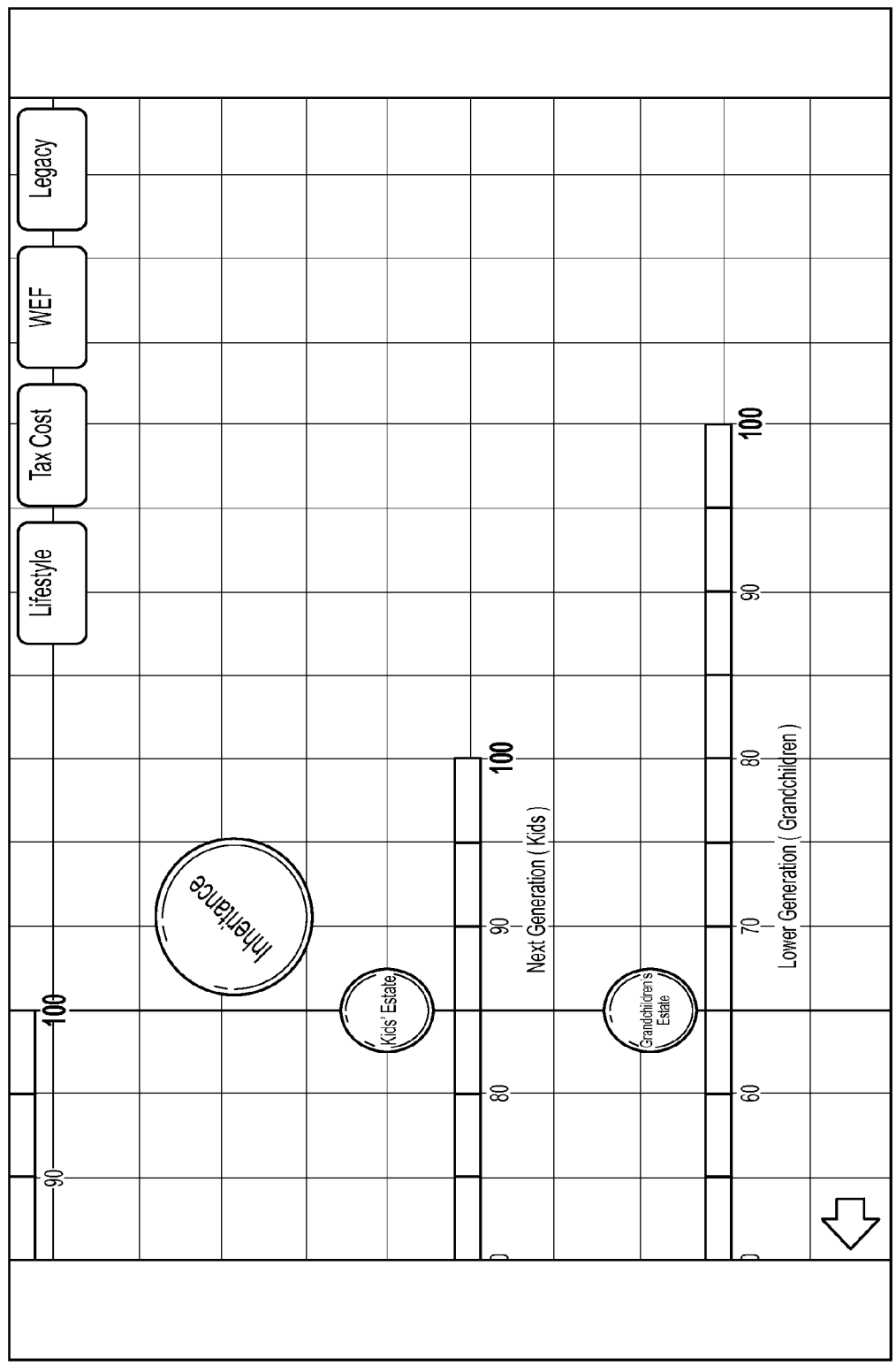
Figure 33:
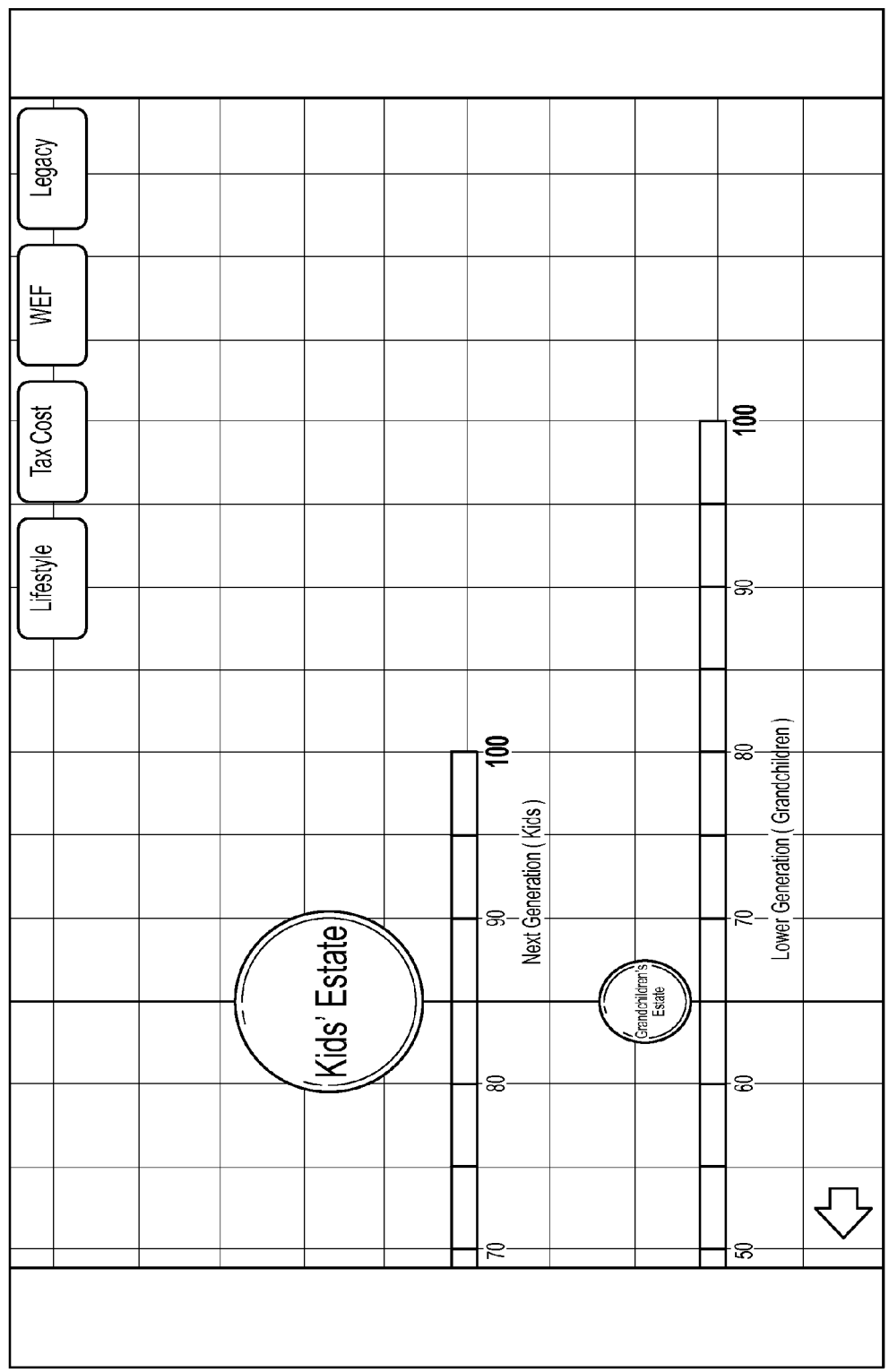

FIG. 9 is a flow diagram illustrating an example pre-defined user path that a user may follow. All user types, with the exception of administrative users, will be required to follow one of several pre-defined user paths, as shown in FIG. 9.

A methodology in one embodiment may simplify financial concepts by taking information and "cinematizing" it into fun, simple, engaging, moving visual representations (aka "movies") accompanied by sound and touch control. Movies contain various assets, incomes, and insurance, as well as intergenerational timelines. This methodology in one embodiment can demonstrate the impact of asset accumulation, distribution, taxes, insurance, investments, intergenerational transfers, and other concepts. This methodology in one embodiment allows individuals to gain a unique perspective on how the financial decisions they make (past, present and future) can impact their overall financial picture (movie). This methodology in one embodiment can illustrate and factor for contributions and distributions, as well as risks or attacks that may draw against one's financial stability (e.g., death, disabilities, long term care costs, lawsuits, natural disasters, market volatility, etc.). The methodology in one embodiment can illustrate a single financial concept, compare several financial strategies, or portray a fully integrated, multi-generational, financial plan.

The invention claimed is:

1. A method of presenting an entity's financial information, comprising:
   receiving input data associated with the entity's financial information;
   generating, by a computer, an animated representation of the entity's financial information along one or more determined timelines employing a plurality of graphical characters based on the input data; and
   displaying the animated representation,
   wherein the generating comprises generating moving images of the plurality of graphical characters changing to represent changes in the entity's financial information,
   wherein the graphical characters represent assets and liabilities, and the graphical characters changing comprises the graphical characters expanding, contracting, exploding, melting into one another, dividing, changing texture, changing permeability, or changing color, or combinations thereof, to represent changes in the assets and liabilities over time, and
   wherein the graphical characters further comprise a visual membrane representing tax that the graphical characters that represent assets pass through at a specified time.

2. The method of claim 1, wherein the one or more timelines comprises a timeline that represents the entity's lifespan.

3. The method of claim 2, wherein the one or more timelines further comprises a generational timeline representing a lifespan of earlier or later generation to the entity's lifespan.

4. The method of claim 2, wherein the graphical characters further comprise a meridian line that travels through the center of the graphical characters that represent assets, and wherein the meridian line together with the graphical characters that represent assets move along the timeline to represent passage of time.

5. The method of claim 2, wherein the graphical characters further comprise a barrier membrane that represents how well protected the graphical characters that represent assets are from a wealth eroding factor attack, a level of protection represented graphically by a degree of thickness of the barrier membrane.

6. The method of claim 2, wherein the graphical characters further comprise an income river and a feeder tube connecting the income river to the graphical characters that represent assets, to animate income flow.

7. The method of claim 2, wherein the graphical characters that represent assets further contain sub-characters to represent different types of assets.

8. The method of claim 2, wherein the graphical characters that represent assets further contain a visual representation associated with a secondary value of a corresponding asset.

9. The method of claim 2, wherein the graphical characters further comprise visual tax bubble characters that represent taxes and visual money bubble characters that represent sums of money.

10. The method of claim 2, wherein the graphical characters further comprise one or more pools that represent respective one or more sums of values.

11. The method of claim 2, further including:
providing a movie control panel to enable controlling the displaying of the animated representation, including pausing, rewinding, fast-forwarding, zooming-in and zooming-out.

12. The method of claim 1, wherein the animated representation demonstrates an impact associated with asset accumulation, distribution, taxes, insurance, investments, or intergenerational transfers, or combinations thereof over a specified period of time.

13. A method of presenting an entity's financial information, comprising:
receiving input data associated with the entity's financial information;
generating, by a computer, an animated representation of the entity's financial information along one or more determined timelines employing a plurality of graphical characters based on the input data; and
displaying the animated representation,
wherein the generating comprises generating moving images of the plurality of graphical characters changing to represent changes in the entity's financial information,
wherein the graphical characters represent assets and liabilities, and the graphical characters changing comprises the graphical characters expanding, contracting, exploding, melting into one another, dividing, changing texture, changing permeability, or changing color, or combinations thereof to represent changes in the assets and liabilities over time, and
wherein the graphical characters further comprise a traveling membrane that appears or disappears according to its defensive quality to a wealth eroding factor attack.

14. A method of presenting an entity's financial information, comprising:
receiving input data associated with the entity's financial information;
generating, by a computer, an animated representation of the entity's financial information along one or more determined timelines employing a plurality of graphical characters based on the input data; and
displaying the animated representation,
wherein the generating comprises generating moving images of the plurality of graphical characters changing to represent changes in the entity's financial information,
wherein the graphical characters represent assets and liabilities, and the graphical characters changing comprises the graphical characters expanding, contracting, exploding, melting into one another, dividing, changing texture, changing permeability, or changing color, or combinations thereof, to represent changes in the assets and liabilities over time, and
wherein the graphical characters further comprise a character representing a wealth eroding factor, the character representing the wealth eroding factor animated to attack the graphical characters that represent assets.

15. The method of claim 14, wherein the graphical characters further comprise a drain tube connecting the character representing the wealth eroding factor and one or more of the graphical characters that represent assets, to animate draining of an asset.

16. A non-transitory computer storage medium comprising computer instructions for performing a method of presenting an entity's financial information, the method comprising:
receiving input data associated with the entity's financial information;
generating, by a computer, an animated representation of the entity's financial information along one or more determined timelines employing a plurality of graphical characters based on the input data; and
displaying the animated representation,
wherein the generating comprises generating moving images of the plurality of graphical characters changing to represent changes in the entity's financial information,
wherein the graphical characters represent assets and liabilities, and the graphical characters changing comprises the graphical characters expanding, contracting, exploding, melting into one another, dividing, changing texture, changing permeability, or changing color, or combinations thereof, to represent changes in the assets and liabilities over time, and
wherein the graphical characters further comprise a visual membrane representing tax that the graphical characters that represent assets pass through at a specified time.

17. The non-transitory computer storage medium of claim 16, wherein the animated representation demonstrates an impact associated with asset accumulation, distribution, taxes, insurance investments or intergenerational transfers or combinations thereof over a specified period of time.

18. The non-transitory computer storage medium of claim 16, wherein the graphical characters further comprise a character representing a wealth eroding factor, the character representing the wealth eroding factor animated to attack the graphical characters that represent assets.

19. The non-transitory computer storage medium of claim 18, wherein the graphical characters further comprise a drain tube connecting the character representing the wealth eroding factor and one or more of the graphical characters that represent assets, to animate draining of an asset.

20. A system for presenting an entity's financial information, comprising:
a processor;
a module operable to execute on the processor and further operable to receive input data associated with the entity's financial information, the module further operable to generate an animated representation of the entity's financial information along one or more determined timelines employing a plurality of graphical characters based on the input data, the module further operable to display the animated representation,
wherein the generating comprises generating moving images of the plurality of graphical characters changing to represent changes in the entity's financial information,
wherein the graphical characters represent assets and liabilities, and the graphical characters changing comprises the graphical characters expanding, contracting, exploding, melting into one another, dividing, changing texture, changing permeability, or changing color, or combinations thereof, to represent changes in the assets and liabilities over time, and
wherein the graphical characters further comprise a visual membrane representing tax that the graphical characters that represent assets pass through at a specified time.

* * * * *

UNITED STATES PATENT AND TRADEMARK OFFICE
CERTIFICATE OF CORRECTION

| | | |
|---|---|---|
| PATENT NO. | : 8,462,162 B2 | Page 1 of 1 |
| APPLICATION NO. | : 13/396778 | |
| DATED | : June 11, 2013 | |
| INVENTOR(S) | : Careri et al. | |

It is certified that error appears in the above-identified patent and that said Letters Patent is hereby corrected as shown below:

On the title page item (76), should read:

Christopher Frank Careri, North Babylon, NY (US);
Enrico Indelicato, III, North Babylon, NY (US)

Signed and Sealed this
Twenty-second Day of April, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,462,162 B2 | Page 1 of 1 |
| APPLICATION NO. | : 13/396778 | |
| DATED | : June 11, 2013 | |
| INVENTOR(S) | : Christopher Franklin Careri et al. | |

It is certified that error appears in the above-identified patent and that said Letters Patent is hereby corrected as shown below:

On the title page change item "(76)" to read --(75)--

On the title page insert item (73),

--Assignee: JANIK LLC., North Babylon, New York--

Signed and Sealed this
Ninth Day of February, 2016

Michelle K. Lee
*Director of the United States Patent and Trademark Office*